US011436526B1

(12) United States Patent
Ganesan et al.

(10) Patent No.: US 11,436,526 B1
(45) Date of Patent: Sep. 6, 2022

(54) SYSTEMS AND METHODS FOR BOT-ON-BOT OPTIMIZATION

(71) Applicant: NTT DATA Services, LLC, Plano, TX (US)

(72) Inventors: Dhurai Ganesan, Chennai (IN); Aananthanarayanan Pandian, Chennai (IN); Sankar Chandrasekaran, Chennai (IN)

(73) Assignee: NTT DATA Services, LLC, Plano, TX (US)

( * ) Notice: Subject to any disclaimer, the term of this patent is extended or adjusted under 35 U.S.C. 154(b) by 864 days.

(21) Appl. No.: 16/286,037

(22) Filed: Feb. 26, 2019

Related U.S. Application Data

(60) Provisional application No. 62/636,059, filed on Feb. 27, 2018.

(51) Int. Cl.
| | |
|---|---|
| *G06N 20/00* | (2019.01) |
| *G05B 19/048* | (2006.01) |
| *G06F 9/54* | (2006.01) |
| *G06F 16/2458* | (2019.01) |

(52) U.S. Cl.
CPC .......... *G06N 20/00* (2019.01); *G05B 19/048* (2013.01); *G06F 9/541* (2013.01); *G06F 16/2465* (2019.01)

(58) Field of Classification Search
CPC .............................. G06N 20/00; G05B 10/048
USPC ......................................................... 706/14
See application file for complete search history.

(56) References Cited

U.S. PATENT DOCUMENTS

| 8,448,260 B1 | 5/2013 | Hansen |
| 10,802,453 B2 | 10/2020 | Allen, IV et al. |
| 2012/0240185 A1* | 9/2012 | Kapoor ............... H04L 41/0866 726/1 |
| 2019/0089740 A1 | 3/2019 | Hastings |

(Continued)

FOREIGN PATENT DOCUMENTS

| JP | 2001509294 | * | 7/2001 | ............. G06Q 30/06 |
| WO | WO-2011094484 A1 | * | 8/2011 | ............. G06F 11/008 |

OTHER PUBLICATIONS

Pinela, "Recommender Systems—User-Based and Item-Based Collaborative Filtering," https://medium.com/@cfpinela/recommender-systems-user-based-and-item-based-collaborative-filtering-5d5f375a127f, Nov. 5, 2017, pp. 1-6.

(Continued)

*Primary Examiner* — John Q Chavis
(74) *Attorney, Agent, or Firm* — Shackelford, Bowen, McKinley & Norton, LLP

(57) ABSTRACT

In an embodiment, a method includes deploying a learning bot onto a system of bots, where the learning bot monitors a first bot of the system of bots, the first bot executing a first automated process. The method further includes determining a learning phase of the learning bot. The learning bot utilizes a plurality of learning phases including a first learning phase, a second learning phase and a third learning phase. The method also includes, responsive to a determination that the learning bot is in the third learning phase, the learning bot: monitoring activity related to the first automated process; collecting data related to the monitored activity; analyzing at least a portion of the collected data; identifying an automatic tuning adjustment responsive to the analyzing; and automatically making the automatic tuning adjustment to the first automated process.

20 Claims, 22 Drawing Sheets

(56) References Cited

U.S. PATENT DOCUMENTS

2019/0124114 A1 4/2019 Purushothaman
2019/0155225 A1 5/2019 Kothandaraman et al.

OTHER PUBLICATIONS

Dimitry Tech, "Analytics," https://web.archive.org/web/20180107101023/http://dimitrytech.com/analytics.html, 2017, pp. 1-4.

Smetsers, "Association rule mining for recommender systems," Tilburg University, School of Humanities, Department of Communication and Information Sciences, Tilburg center for Cognition and Communication (TiCC), Tilburg, The Netherlands, Aug. 2013, pp. 1-76.

DMS Solutions, "Robotic Process Automation: UI vs background automation in RPA (Robotics) projects," Nov. 16, 2017, 4 pages.

UiPath, "The Security Requirements for A Global RPA Platform," Sep. 14, 2017, 7 pages.

* cited by examiner

SYSTEMS AND METHODS FOR BOT-ON-BOT OPTIMIZATION

CROSS-REFERENCE TO RELATED APPLICATIONS

This patent application claims priority from, and incorporates by reference the entire disclosure of, U.S. Provisional Patent Application No. 62/636,059 filed on Feb. 27, 2018.

BACKGROUND

Technical Field

The present disclosure relates generally to the deployment and utilization of bots for automated tasks and more particularly, but not by way of limitation, to systems and methods for utilizing learning bots to optimize an automated tasks along with compliance bots to monitor and ensure an automated task is in compliance with required security controls.

History of Related Art

Automated processing activities are manually evaluated by auditors to eliminate waste and improve productivity. Currently, these auditors also plan for the maximum utilization of the resources using various different methodologies. Often, these are considered as separate projects to improve performance of automated processes. These projects identify inefficiencies, provide suggested improvements, implement suggested improvements and begin to analyze evidential results of the suggested improvements which can result in increasingly long project times. Furthermore, compliance auditing is being carried out manually by the auditors who must manually review the processes and compliance rules for all automations and certify the automation is in accordance to industry standards. With the voluminous number of automated processes in any given system, auditing performance and compliance becomes increasingly difficult.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method including, by a computer system, deploying a learning bot onto a system of bots, where the learning bot monitors a first bot of the system of bots, the first bot executing a first automated process. The method further includes determining a learning phase of the learning bot. The learning bot utilizes a plurality of learning phases including: a first learning phase in which manual fine tuning of the first automated process occurs, such that, while in the first learning phase, the learning bot monitors and learns from manual tuning activity performed by a user of a client computer system; a second learning phase in which assisted fine tuning of the first automated process occurs, such that the learning bot monitors and learns from the manual tuning activity performed by the user of the client computer system and recommends to the user of the client computer system that one or more tuning adjustments to be made to the first automated process and a third learning phase in which automated fine tuning of the first automated process occurs, such that the learning bot automatically makes at least one tuning adjustment to the first automated process. The method also includes, responsive to a determination that the learning bot is in the third learning phase, the learning bot: monitoring activity related to the first automated process; collecting data related to the monitored activity; analyzing at least a portion of the collected data; identifying an automatic tuning adjustment responsive to the analyzing; and automatically making the automatic tuning adjustment to the first automated process. Other embodiments of this aspect include corresponding computer systems, apparatus, and computer programs recorded on one or more computer storage devices, each configured to perform the actions of the methods.

In an embodiment, another general aspect includes a computer system including a processor and memory, where the processor and the memory in combination are operable to implement a method including deploying a learning bot onto a system of bots, where the learning bot monitors a first bot of the system of bots, the first bot executing a first automated process. The method further includes determining a learning phase of the learning bot. The learning bot utilizes a plurality of learning phases including: a first learning phase in which manual fine tuning of the first automated process occurs, such that, while in the first learning phase, the learning bot monitors and learns from manual tuning activity performed by a user of a client computer system; a second learning phase in which assisted fine tuning of the first automated process occurs, such that the learning bot monitors and learns from the manual tuning activity performed by the user of the client computer system and recommends to the user of the client computer system that one or more tuning adjustments to be made to the first automated process and a third learning phase in which automated fine tuning of the first automated process occurs, such that the learning bot automatically makes at least one tuning adjustment to the first automated process. The method also includes, responsive to a determination that the learning bot is in the third learning phase, the learning bot: monitoring activity related to the first automated process; collecting data related to the monitored activity; analyzing at least a portion of the collected data; identifying an automatic tuning adjustment responsive to the analyzing; and automatically making the automatic tuning adjustment to the first automated process.

In an embodiment, another general aspect includes a computer-program product including a non-transitory computer-usable medium having computer-readable program code embodied therein, the computer-readable program code adapted to be executed to implement a method including deploying a learning bot onto a system of bots, where the learning bot monitors a first bot of the system of bots, the first bot executing a first automated process. The method further includes determining a learning phase of the learning bot. The learning bot utilizes a plurality of learning phases including: a first learning phase in which manual fine tuning of the first automated process occurs, such that, while in the first learning phase, the learning bot monitors and learns from manual tuning activity performed by a user of a client computer system; a second learning phase in which assisted fine tuning of the first automated process occurs, such that the learning bot monitors and learns from the manual tuning activity performed by the user of the client computer system and recommends to the user of the client computer system that one or more tuning adjustments to be made to the first automated process and a third learning phase in which automated fine tuning of the first automated process occurs, such that the learning bot automatically makes at least one tuning adjustment to the first automated process. The method also includes, responsive to a determination that the learning bot is in the third learning phase, the learning bot: monitoring activity related to the first automated process; collecting data related to the monitored activity; analyzing at least a portion of the collected data; identifying an automatic tuning adjustment responsive to the analyzing; and automatically making the automatic tuning adjustment to the first automated process.

In an embodiment, another general aspect includes a method including, by a compliance bot deployed on a computer system including a system of bots, monitoring the system of bots for deployment activity. The method also includes, responsive to the monitoring, identifying activity indicative of deployment of a particular bot. The method also includes determining an automation type of the particular bot. The method also includes retrieving compliance rules corresponding to the automation type of the particular bot. The method also includes retrieving data from the particular bot. The method also includes automatically checking compliance of the particular bot with the compliance rules based on the retrieved data. The method also includes, responsive to a determination that the particular bot is noncompliant, automatically invalidating the particular bot. Other embodiments of this aspect include corresponding computer systems, apparatus, and computer programs recorded on one or more computer storage devices, each configured to perform the actions of the methods.

In an embodiment, another general aspect includes a computer system including a processor and memory, where the processor and the memory in combination are operable to implement a method. The method includes, by a compliance bot deployed on the computer system, monitoring a system of bots for deployment activity. The method also includes, responsive to the monitoring, identifying activity indicative of deployment of a particular bot. The method also includes determining an automation type of the particular bot. The method also includes retrieving compliance rules corresponding to the automation type of the particular bot. The method also includes retrieving data from the particular bot. The method also includes automatically checking compliance of the particular bot with the compliance rules based on the retrieved data. The method also includes, responsive to a determination that the particular bot is noncompliant, automatically invalidating the particular bot.

In an embodiment, another general aspect includes a computer-program product including a non-transitory computer-usable medium having computer-readable program code embodied therein, the computer-readable program code adapted to be executed to implement a method. The method includes, by a compliance bot deployed on a computer system, monitoring a system of bots for deployment activity. The method also includes, responsive to the monitoring, identifying activity indicative of deployment of a particular bot. The method also includes determining an automation type of the particular bot. The method also includes retrieving compliance rules corresponding to the automation type of the particular bot. The method also includes retrieving data from the particular bot. The method also includes automatically checking compliance of the particular bot with the compliance rules based on the retrieved data. The method also includes, responsive to a determination that the particular bot is noncompliant, automatically invalidating the particular bot.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 6A illustrates an example of keyboard library data;

FIG. 6B illustrates an example of database library data;

DETAILED DESCRIPTION

Figure 1:
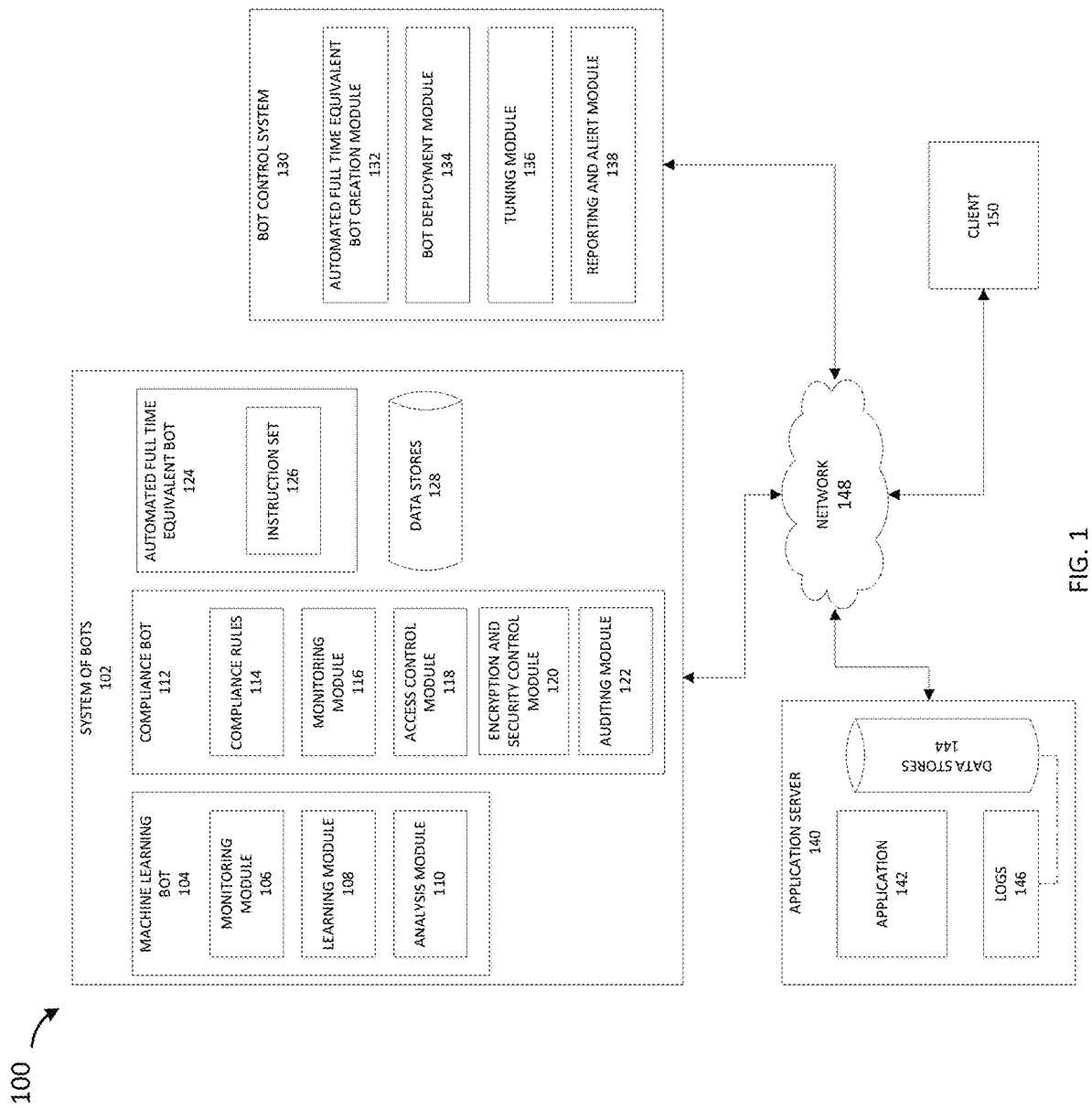
FIG. 1 illustrates an example system for machine learning, compliance and automated fulltime equivalent bot management.

In various embodiments, a computing environment can include, for example, many hundreds or thousands of software agents, often referred to herein as "bots," that automatically perform a sequence of computer-implemented tasks. In various cases, the sequence of computer-implemented tasks performed by each bot can be the same or different, or a combination thereof.

Although bots can provide greater efficiency via increased automation, bots also introduce technical problems. One technical problem relates to performance optimization. For example, a transaction time, as defined by the amount of time the bot takes to perform a given sequence of events, may be unacceptably or unnecessarily lengthy. Identifying specific performance improvements that can result in improved transaction time is technically challenging due to the voluminous quantities of bots that may be deployed in a given system, the amount of developer time required to individually analyze and troubleshoot bots, among other factors. Furthermore, many performance optimizations are unidentifiable for individual bots, for example, because it may be unknown that transaction times can be shortened without impacting a given bot's results or outputs.

Another technical problem is verifying that bots handling sensitive data do so securely and in compliance with applicable security policies. For example, a transaction may include the transmission of sensitive data that requires encryption or implementations of other related security protocols. Identifying that specific security requirements and verifying each transaction of a given bot to ensure security policy adherence can also be challenging due to the extensive quantities of bots that may be deployed in a given system. Furthermore, many transactions that require specific security policies are unidentifiable due to the sheer amount of transactions completed by an individual bot in any given time-frame. Often times, in industries that require strict security implementations, it can be burdensome to verify each deployed bot is in compliance with the security rules and regulations set forth by industry-specific standards, for example, the Health Insurance Portability and Accountability Act (HIPAA), the Federal Information Security Management Act (FISMA), the Gramm-Leach-Bliley Act (GLBA), the Payment Card Industry Data Security Standards (PCI DSS) and the Electronic Fund Transfer Act (EFTA), among others.

One way to address these technical problems is to introduce various levels of human review. However, human review results in additional time before performance or compliance problems are resolved and many result in additional time before performance or compliance problems are resolved, which results in additional time for bots to be taken offline, for example, when security prerequisites need to be addressed.

The present disclosure describes examples of autonomously managing a system of bots on a given network by reviewing and analyzing instructions sets, defined herein as the sequence of tasks to be performed for each bot, modifying the instruction sets automatically and actively monitoring instruction sets and bot activity for adherence to security requirements. In certain embodiments, the autonomously managing a system of bots comprises managing machine learning bots, compliance bots and Automated Full-Time Equivalent (AFTE) bots with a variety of bot control modules with a bot control system. In certain embodiments, the system can contain a single bot, or a plurality of bots, operating a single application, or a plurality of applications, which can be accessible on a network. In certain embodiments, the bots contain multiple modules each communicatively coupled to exchange and process relevant data from a variety of bots with varying functionalities.

In some embodiments, a machine learning bot can be utilized to monitor, learn and suggest recommendations to a user, via a client system, to improve overall productivity and/or functionality of another bot on a network with a plurality of bots. This reduces the amount of manual intervention required, thus reducing the amount of human resources and time needed. In some embodiments, the machine learning bot can learn from these recommendations and transition from assisting the user, via a client system, to taking automatic control of the other bot, while continually monitoring the other bot, thereby constantly improving the productivity and/or functionality of the other bot.

In some embodiments, a compliance bot can be utilized to monitor the security regulations to ensure each deployed AFTE bot is in compliance with its respective security rules and regulations. In some embodiments, the compliance bot can verify compliance before the AFTE bot is deployed. Manual intervention and auditing of AFTE bots is a daunting task and can often lead to AFTE bots that are uncertified and would result in noncompliance with an industry-specific standard. The deployment of a compliance bot to regularly audit other bots within a network alleviates the necessity of manual audits of each AFTE bot individually thereby alleviating the amount of human resources required.

FIG. 1 illustrates an example system 100 for machine learning, compliance and AFTE bot control. The system 100 includes a system of bots 102, a bot control system 130, an application server 140 and a client 150 each communicatively coupled by a network 148. The system of bots 102 includes a machine learning bot 104, a compliance bot 112, an AFTE bot 124 and data stores 128. In various embodiments, the system of bots 102 can be made up of a single bot performing multiple functions or a plurality of bots performing the same and/or different functions. In some embodiments, a single bot performs algorithms cumulative of each of the machine learning bot 104, the compliance bot 112, and the AFTE bot 124. In some embodiments, the data stores 128 can be a data store for each individual bot within the system of bots 102, can be a shared data store for each individual bot of the system of bots 102 or can be a remote data store that is unique to each bot or shared between bots within the system of bots 102. In certain embodiments, the data stores 128 can be utilized as an event library, in which each actions performed by any bot and/or the client 150 is stored. The event library can also contain business rule libraries, exception libraries, control libraries, keyboard libraries, database libraries and/or cognitive libraries. In various embodiments, the machine learning bot 104, the compliance bot 112, the AFTE bot 124 and the data stores 128 are communicatively connected via a client/server connection or via a peer-to-peer connection over the network 148.

In certain embodiments, the machine learning bot 104 includes a monitoring module 106, a learning module 108 and an analysis module 110. In some embodiments, the monitoring module 106, the learning module 108 and the analysis module 110 can be a single module or a set of shared modules to be used by other bots within the system of bots 102. The compliance bot 112 includes a set of compliance rules 114, a monitoring module 116, an access control module 118, an encryption and security control module 120 and an auditing module 122. In some embodiments, the compliance rules 114, the monitoring module 116, the access control module 118, the encryption and security control module 120 and the auditing module 122 can be a single module or a set of shared modules to be used by other bots within the system of bots 102.

The AFTE bot 124 includes an instruction set 126 that can be used to provide the AFTE bot 124 a complete set of all computer-implemented tasks that are to be performed in sequence automatically by the AFTE bot 124. In certain embodiments, the instruction set 126 can be reviewed, analyzed and modified by the machine learning bot 104 to optimize transactions performed by the AFTE bot 124. In other embodiments, the compliance bot 112 can review, analyze and modify the instruction set 126 based on specific security policy requirements, for example, security policies as set forth in the compliance rules 114. In some embodiments, the instruction set 126 is in a machine-readable code that can be recognized and executed by a central processing unit.

In various embodiments, the instruction set 126 can be made up of, for example, a markup language, a low-level programming language, a high-level programming language, a scripting language, a machine language, an assembly language or any combination thereof. In various embodiments, the AFTE bot 124 can be configured to take the role of the compliance bot 112 and/or the machine learning bot 104. In other embodiments, the AFTE bot 124 can be utilized to automate any manual process or time-consuming task. For example, and not by way of limitation, the AFTE bot 124 could utilize components from the event library stored in the data stores 128 to perform automated tasks capable of web automations, remote operations, database functions, terminal connections, desktop operations, text operations, mouse simulations, keyboard simulations, folder operations, file handlers, clipboard handlers, and the like.

In various embodiments, each module, rule set and/or instruction set of the machine learning bot 104, the compliance bot 112 and the AFTE bot 124 are stored within the data stores 128 and/or are shared between other bots within the system of bots 102. In other embodiments, each module is isolated from other modules thereby eliminating cross-communication between the modules of each bot within the system of bots 102. In further embodiments, the machine learning bot 104, the compliance bot 112 and the AFTE bot 124 are paired together in an isolated container, for example, the compliance bot 112 and the AFTE bot 124, such that cross-communication with other bots, or bot containers, is eliminated. In some embodiments, the modules of the machine learning bot 104 and the compliance bot 112 can be a single algorithm or a plurality of algorithms.

In certain embodiments, the bot control system 130 includes an AFTE bot creation module 132, a bot deployment module 134, a tuning module 136 and a reporting and alert module 138. In some embodiments, the AFTE bot creation module 132, the bot deployment module 134, the tuning module 136 and the reporting and alert module 138 is accessible by a user via the client 150 over the network 148. In certain embodiments, the AFTE bot creation module 132, the bot deployment module 134, the tuning module 136 and the reporting and alert module 138 can be a single module cumulative of algorithms for each individual module. In certain embodiments, the AFTE bot creation module 132, the bot deployment module 134, the tuning module 136 and the reporting and alert module 138 can reside on the data stores 128 and/or can reside on a remote data store that is unique to each module or shared between each module within the bot control system 130.

The AFTE bot creation module 132 can be utilized to create an AFTE bot, for example, the AFTE bot 124 of the system of bots 102. In some embodiments, an instruction set is created via the AFTE bot creation module 132 that contains all of the instructions and/or modules for a specific type of bot, for example, the machine learning bot 104 of the system of bots 102. In certain embodiments, the AFTE bot creation module 132 can utilize the event library data of the data stores 128 to create an AFTE bot, as discussed above with respect to the AFTE bot 124. In some embodiments, the AFTE bot creation module 132 includes a graphical user interface (GUI) for the manual creation of an instruction set to be utilized on a specific AFTE bot by the client 150, for example, the instruction set 126 of the AFTE bot 124. In other embodiments, the AFTE bot creation module 132 is an automatic process that generates an instruction set for a specific AFTE bot without manual interaction.

In certain embodiments, the bot deployment module 134 can be utilized to deploy a bot into the system of bots 102, for example, the machine learning bot 104. In various embodiments, the bot deployment module 134 can utilize an instruction set created by the AFTE bot creation module 132 that can then be deployed. For example, the instruction set 126 of the AFTE bot 124 could be representative of an AFTE bot created by the AFTE bot creation module 132 and then deployed to the system of bots 102 via the bot deployment module 134. In certain embodiments, the bot deployment module 134 can be used to deploy a single bot and/or a plurality of bots to the system of bots 102 concurrently. In other embodiments, the bot deployment module 134 can be utilized to deploy bots on a variety of networks and/or bot-networks outside of the network 148. In other embodiments, the bot deployment module 134 can be utilized by any bot within the system of bots 102 on the network 148. In some embodiments, the bot deployment module 134 includes a GUI for the manual deployment of a specific AFTE bot by the client 150, for example, the AFTE bot 124. In other embodiments, the bot deployment module 134 is an automatic process that deploys bots without manual interaction.

The tuning module 136 can be utilized to re-configure, optimize and/or customize already deployed bots in the system of bots 102, for example, the AFTE bot 124. In some embodiments, the tuning module 136 is accessed via the client 150 to optimize a single and/or plurality of bots within the system of bots 102. In certain embodiments, the machine learning bot 104 can utilized data stored in the data stores 128 to further tune, or optimize, an existing bot on the system of bots 102. In other embodiments, the tuning module 136 can be utilized by any bot within the system of bots 102 on the network 148. In some embodiments, the tuning module 136 can be utilized to tune a bot that is in queue to be deployed to the system of bots 102 by the bot deployment module 134. In some embodiments, the tuning module 136 includes a GUI for the manual tuning of a specific bot by the client 150, for example, the AFTE bot 124. In other embodiments, the tuning module 136 is an automatic process that tunes bots without manual interaction.

The reporting and alert module 138 can be utilized to send reports or alerts to the client 150 and/or any device connected to the network 148. In various embodiments, the reports and alerts provided by the reporting and alert module 138 can be provided real-time and/or at specific time intervals as required. In other embodiments, the reporting and alert module 138 generates reports and/or alerts based on pre-determined triggers. In other embodiments, the reporting and alert module 138 can be utilized by any bot within the system of bots 102 and/or the client 150 on the network 148. In some embodiments, the alerts can be sent via electronic mail and/or any other electronic alert medium, including but not limited to, RSS feeds, push notifications and the like. In some embodiments, the reporting and alert module 138 includes a GUI for the accessing alerts and reports by the client 150. In other embodiments, the reporting and alert module 138 is an automatic process that creates reports and alerts without manual interaction.

In certain embodiments, the application server 140 includes an application 142, data stores 144 and within the data stores 144 logs 146. In various embodiments, the application 142 can include multiple applications with varying functionality and/or the data stores 144 can include multiple data stores spanning across multiple networks. In some embodiments, the logs 146 can contain events that occur within the application server 140 and/or the application 142. In other embodiments, the logs 146 contain connection data and/or messages collected during the usage of the application 142 by the client 150 and/or a bot from the system of bots 102, for example, the machine learning bot 104 or the AFTE bot 124. In certain embodiments, the log 146 is a transaction log that includes communications, e.g., transactions, between the application server 140 and/or the application 142 or the client 150, and any combination thereof. In some embodiments, the logs 146 can utilize a data collection method that automatically captures the type, content, and/or time of transactions made by the client 150 and/or any bot within the system of bots 102 accessing the application server 140 and/or the application 142. In certain embodiments, the application 142 can monitor all activities within the network 148 and store events and/or transactions to the logs 146. In some embodiments, the logs are stored in an isolated data store accessible only by authorized and/or allowed connections, for example, the compliance bot 112 or the client 150.

In certain embodiments, the application server 140 can be capable of sending and receiving data across each component connected to the network 148. In various embodiments, the application server 140 can have various interface protocols, for example, transmission control protocol and the internet protocol (TCP/IP), user datagram protocol (UDP), and the like, such that components on the network 148 such as, for example, the system of bots 102, the bot control system 130 and the client 150, can access the application server 140 to send and receive data. In other embodiments, the application server 140 can share information between other bots within the system of bots 102 in order to form a collaborative network of information that can be stored on the data stores 144. In various embodiments, the application server 140 can provide all necessary raw computing power in order to facilitate various computations required, for example, by each module used by a bot within the system of bots 102 and/or each module within the bot control system 130 or the client 150.

In certain embodiments, the monitoring module 106 of the machine learning bot 104 monitors the events and/or transactions recorded in the logs 146 of specific tasks and/or operations either performed by the client 150 and/or a bot within the system of bots 102, for example, the AFTE bot 124. In some embodiments, data collected from the monitoring module 106 of the machine learning bot 104 can be stored on the data stores 128. Once the logs 146 are monitored via the monitoring module 106 of the machine learning bot 104, data is then processed either at a predetermined time, or real-time, by the learning module 108 of the machine learning bot 104 utilizing a machine learning algorithm, as will be described with respect to FIG. 4. In some embodiments, during the learning cycle of the learning module 108, the machine learning bot 104 can utilize the analysis module 110 to review and analyze the process and/or functions being monitored. In some embodiments, the machine learning bot 104 can be utilized to monitor, learn and analyze a single function, or operation, or a plurality of functions and/or operations performed by either the client 150 and/or a bot within the system of bots 102, for example, the AFTE bot 124.

In certain embodiments, once the compliance bot 112 has received, or has been deployed with, the compliance rules 114, the monitoring module 116 of the compliance bot 112 monitors the events and/or transactions recorded in the logs 146 of specific tasks and/or operations either performed by the client 150 and/or a bot within the system of bots 102, for example, the AFTE bot 124. In some embodiments, data collected from the monitoring module 116 of the compliance bot 112 can be stored on the data stores 128. Once the logs 146 are monitored via the monitoring module 116 of the compliance bot 112, data is then processed either at a predetermined time, or real-time, by one or more of the access control module 118, the encryption and security control module 120 and/or the auditing module 122 of the compliance bot 112. In some embodiments, the access control module 118 of the compliance bot 112 can connect to the application server 140 to ensure that adequate access control measures are activated. In some embodiments, the encryption and security control module 120 of the compliance bot 112 can connect to the data stores 144 of the application server 140 to verify that encryption is activated for any automation process and/or bot within the system of bots 102, for example, the AFTE bot 124 that accesses the data stores 144. In certain embodiments, the auditing module 122 of the compliance bot 112 can audit the logs 146 to ensure adherence to any given set of the compliance rules 114 of the compliance bot 112.

In various embodiments, the functionality of the modules contained in the bot control system 130, each individual and/or plurality of bots from the system of bots 102, each individual and/or plurality of modules within the machine learning bot 104 and/or the compliance bot 112, the compliance rules 114, the instruction set 126 and the data stores 128 can be made available to the client 150 via the network 148. In certain embodiments, the application 142, the data stores 144 and the logs 146 can be made available to the client 150 via the network 148. In various embodiments, the system 100 can contain a plurality of clients. The client 150 can include, for example, thin clients, desktop computers, laptop computers, tablet computers, smart phones, wearable or body-borne computers, and the like.

Figure 2:
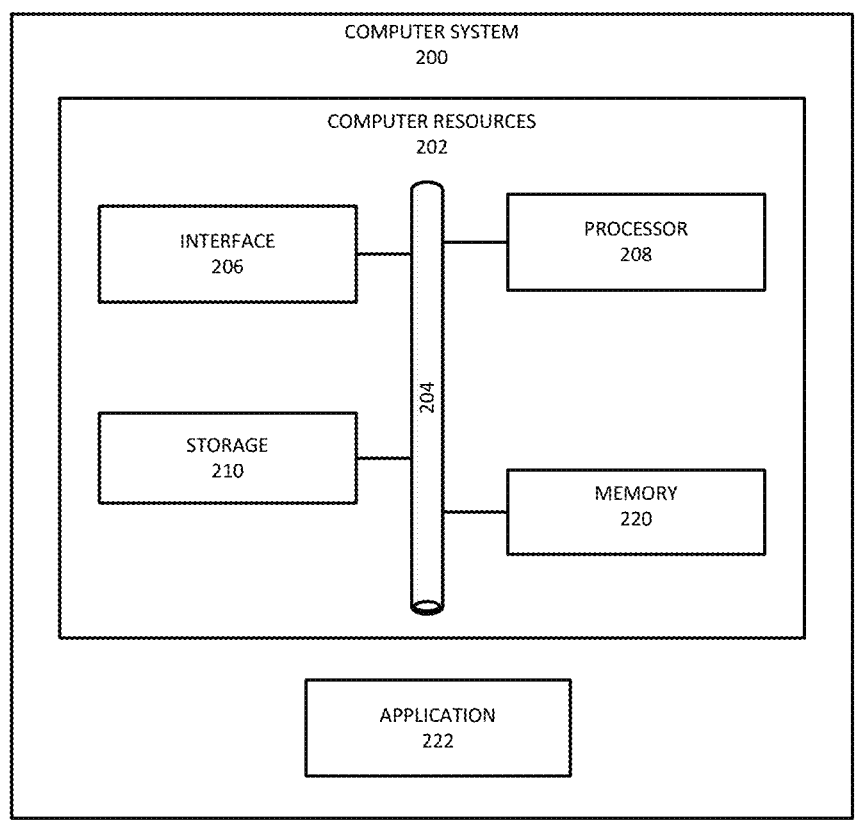
FIG. 2 illustrates an example of a computer system.

FIG. 2 illustrates an example of a computer system 200 that, in some cases, can be representative, for example, of the machine learning bot 104, the compliance bot 112, the AFTE bot 124, the bot control system 130, modules within the bot control system 130, that application server 140 and/or the client 150. The computer system 200 includes an application 222 operable to execute on computer resources 202. The application 222 can be, for example, an interface for operating the machine learning bot 104, the compliance bot 112, the AFTE bot 124, the bot control system 130 and/or the application server 140. In other embodiment the application 222 can be, for example, an interface for operating each module within the bot control system 130 and/or each module of the machine learning bot 104 and/or the compliance bot 112. The application 222 can be, for example, an interface for interacting with the compliance rules 114 and/or the instruction set 126. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 208, memory 220, storage 210, interface 206, and bus 204. Although a particular computer system is depicted having a particular number of particular components in a particular arrangement, this disclosure contemplates any suitable computer system having any suitable number of any suitable components in any suitable arrangement.

Processor 208 may be a microprocessor, controller, or any other suitable computing device, resource, or combination of hardware, software and/or encoded logic operable to execute, either alone or in conjunction with other components, (e.g., memory 220), the application 222. Such functionality may include providing various features discussed herein. In particular embodiments, processor 208 may include hardware for executing instructions, such as those making up the application 222. As an example, and not by way of limitation, to execute instructions, processor 208 may retrieve (or fetch) instructions from an internal register, an internal cache, memory 220, or storage 210; decode and execute them; and then write one or more results to an internal register, an internal cache, memory 220, or storage 210.

In particular embodiments, processor 208 may include one or more internal caches for data, instructions, or addresses. This disclosure contemplates processor 208 including any suitable number of any suitable internal caches, where appropriate. As an example, and not by way of limitation, processor 208 may include one or more instruction caches, one or more data caches, and one or more translation lookaside buffers (TLBs). Instructions in the instruction caches may be copies of instructions in memory 220 or storage 210 and the instruction caches may speed up retrieval of those instructions by processor 208. Data in the data caches may be copies of data in memory 220 or storage 210 for instructions executing at processor 208 to operate on; the results of previous instructions executed at processor 208 for access by subsequent instructions executing at processor 208, or for writing to memory 220, or storage 210; or other suitable data. The data caches may speed up read or write operations by processor 208. The TLBs may speed up virtual-address translations for processor 208. In particular embodiments, processor 208 may include one or more internal registers for data, instructions, or addresses. Depending on the embodiment, processor 208 may include any suitable number of any suitable internal registers, where appropriate. Where appropriate, processor 208 may include one or more arithmetic logic units (ALUs); be a multi-core processor; include one or more processors 208; or any other suitable processor.

Memory 220 may be any form of volatile or non-volatile memory including, without limitation, magnetic media, optical media, random access memory (RAM), read-only memory (ROM), flash memory, removable media, or any other suitable local or remote memory component or components. In particular embodiments, memory 220 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 220 may include one or more memories 220, where appropriate. Memory 220 may store any suitable data or information utilized by the computer system 200, including software embedded in a computer readable medium, and/or encoded logic incorporated in hardware or otherwise stored (e.g., firmware). In particular embodiments, memory 220 may include main memory for storing instructions for processor 208 to execute or data for processor 208 to operate on. In particular embodiments, one or more memory management units (MMUs) may reside between processor 208 and memory 220 and facilitate accesses to memory 220 requested by processor 208.

As an example, and not by way of limitation, the computer system 200 may load instructions from storage 210 or another source (such as, for example, another computer system) to memory 220. Processor 208 may then load the instructions from memory 220 to an internal register or internal cache. To execute the instructions, processor 208 may retrieve the instructions from the internal register or internal cache and decode them. During or after execution of the instructions, processor 208 may write one or more results (which may be intermediate or final results) to the internal register or internal cache. Processor 208 may then write one or more of those results to memory 220. In particular embodiments, processor 208 may execute only instructions in one or more internal registers or internal caches or in memory 220 (as opposed to storage 210 or elsewhere) and may operate only on data in one or more internal registers or internal caches or in memory 220 (as opposed to storage 210 or elsewhere).

In particular embodiments, storage 210 may include mass storage for data or instructions. As an example, and not by way of limitation, storage 210 may include a hard disk drive (HDD), a floppy disk drive, flash memory, an optical disc, a magneto-optical disc, magnetic tape, or a Universal Serial Bus (USB) drive or a combination of two or more of these. Storage 210 may include removable or non-removable (or fixed) media, where appropriate. Storage 210 may be internal or external to the computer system 200, where appropriate. In particular embodiments, storage 210 may be non-volatile, solid-state memory. In particular embodiments, storage 210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 210 may take any suitable physical form and may comprise any suitable number or type of storage. Storage 210 may include one or more storage control units facilitating communication between processor 208 and storage 210, where appropriate.

In particular embodiments, interface 206 may include hardware, encoded software, or both providing one or more interfaces for communication (such as, for example, packet-based communication) among any networks, any network devices, and/or any other computer systems. As an example, and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 200 is used. As an example, and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 206 for any one or more of these networks, where appropriate.

In some embodiments, interface 206 may include one or more interfaces for one or more I/O devices. One or more of these I/O devices may enable communication between a person and the computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 208 to drive one or more of these I/O devices. Interface 206 may include one or more interfaces 206, where appropriate.

Bus 204 may include any combination of hardware, software embedded in a computer readable medium, and/or encoded logic incorporated in hardware or otherwise stored (e.g., firmware) to couple components of the computer system 200 to each other. As an example, and not by way of limitation, bus 204 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 204 may include any number, type, and/or configuration of buses 204, where appropriate. In particular embodiments, one or more buses 204 (which may each include an address bus and a data bus) may couple processor 208 to memory 220. Bus 204 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 208 (such as, for example, one or more internal registers or caches), one or more portions of memory 220, one or more portions of storage 210, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
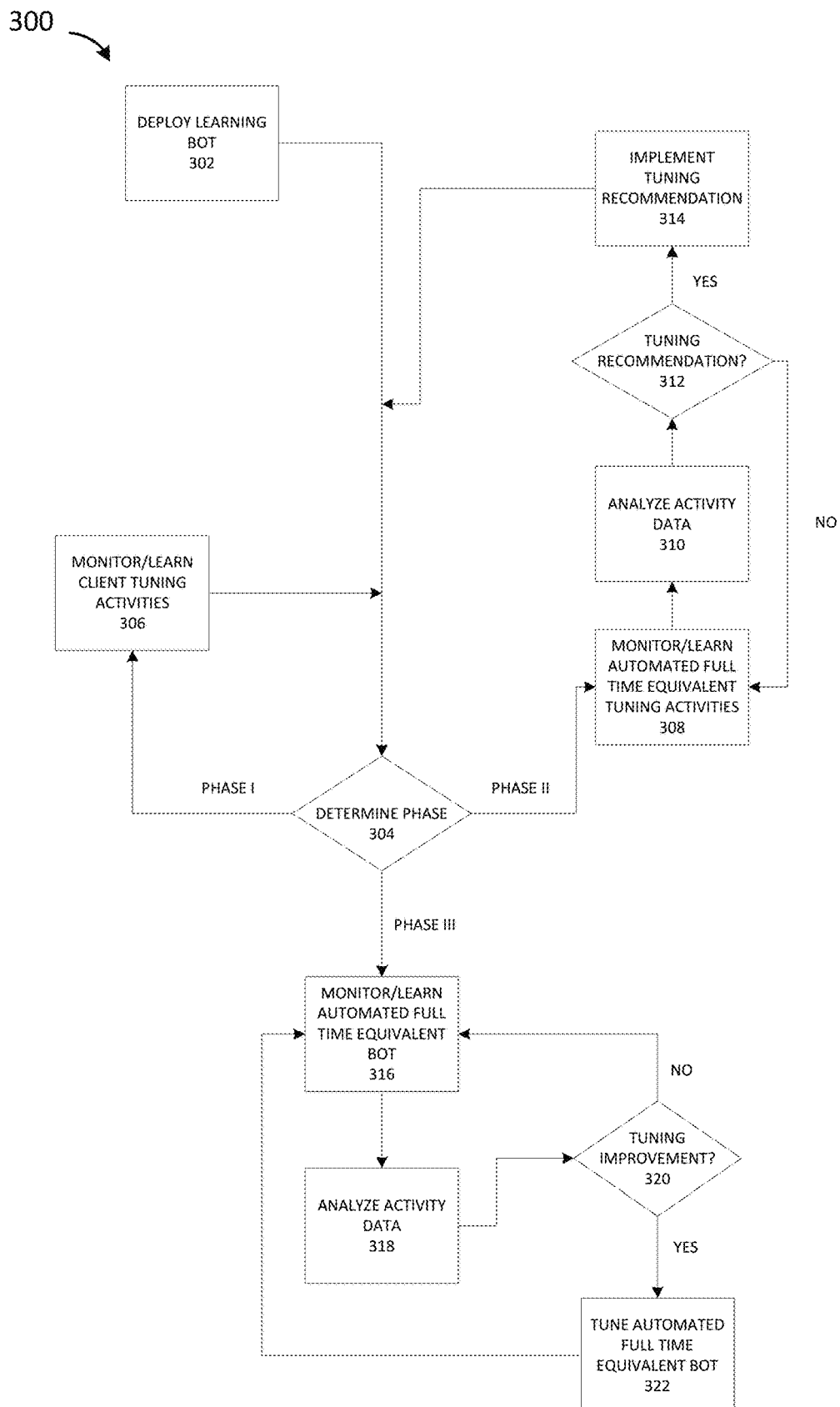
FIG. 3 illustrates an example process of the implementation of a machine learning bot.

FIG. 3 illustrates an example process 300 of the implementation of the machine learning bot 104. It should be appreciated that, although the process 300 is described as being performed with respect to a single machine learning bot and a single automated task, in various embodiments, the process 300 can be repeated, or performed in parallel, by a plurality of machine learning bots within a given system and/or a plurality of automated tasks and/or functions.

At block 302, the machine learning bot 104 is deployed onto the system of bots 102. In some embodiments, the bot deployment module 134 can be utilized to deploy the machine learning bot 104. In some embodiments, the machine learning bot 104 can be deployed in a standalone configuration, wherein the machine learning bot 104 is monitoring a single automated process. In some embodiments, the machine learning bot 104 is monitoring multiple automated operations and/or functions. In other embodiments, the machine learning bot 104 is one of a plurality of machine learning bots deployed to monitor a single and/or plurality of automated tasks and/or functions.

At decision block 304, the machine learning bot 104 determines its learning phase. In various embodiments, any number of phases could be utilized to suit the needs of a particular implementation. For example, and not by way of limitation, the learning phases could include three separate phases. Phase I can refer to manual fine tuning of an automated process such that, for example, while in Phase I, the machine learning bot 104 is monitoring and learning from tuning activity performed by a user of the client 150 with respect to an automated process such as, for example, a function performed by the AFTE bot 124. Phase II can refer to an assisted fine tuning of an automated process such that, for example, while in Phase II, the machine learning bot is monitoring and learning from tuning activity performed by a user of the client 150 with respect to an automated process such as, for example, a function performed by the AFTE bot 124, and also recommending to the client 150 tuning adjustments to be made to that automated process. Phase III can refer to an automated fine tuning of an automated process such that, for example, while in Phase III, the machine learning bot 104 is fully automated to automatically make fine tuning adjustments to an automated process such as for example, a function performed by the AFTE bot 124.

In various embodiments, the machine learning bot 104 can reside in more than one phase at a given time. For example, it may be that some tuning adjustments are appropriate for the automated fine tuning provided by Phase III while other tuning adjustments are only appropriate for the assisted fine tuning of Phase II. By way of further example, still other fine tuning adjustments may not satisfy the criteria for Phase II or Phase III, such that the machine learning bot 104 remains in Phase I at least as to these adjustments. Additionally, in some embodiments, the machine learning bot 104 can continuously operate in Phase I, in addition to Phase II and/or III, so as to continually learn from manual fine tuning as described in greater detail below. Although the machine learning bot 104 can reside in one or a plurality of phases, for simplicity of description, the machine learning bot 104 will be described below with respect to individual phases. It should be appreciated, however, that, in various embodiments, the machine learning bot 104 can perform the functionality of multiple phases in parallel.

If it is determined, at the decision block 304, that the machine learning bot 104 is determined to be in Phase I, the machine learning bot 104 advances to block 306. At the block 306, the machine learning bot 104 can utilize the monitoring module 106 and the learning module 108 to collect data. The collected data can relate, for example, to monitored activity and to tuning adjustments made to an automated process, for example, by a user of the client 150. In some embodiments, the monitoring module 106 is monitoring all activity related to an automated process in which the machine learning bot 104 is designated to learn and can store all relevant data in the data stores 128. In some embodiments, this data can be collected from the logs 146 stored in the data stores 144 of the application server 140. In additionally, the collected data can include observed tuning adjustments made by a user of the client 150. In some embodiments, the machine learning bot 104 iterates this cycle at the decision block 304 until the machine learning bot 104 has reached a predetermined competency level or another trigger is invoked, for example, an administrator ending the task. In some embodiments, the competency level is determined by the amount of time the machine learning bot 104 has spent monitoring and learning an automated process in which the machine learning bot 104 is designated to learn. In other embodiments, the competency level is determined by the amount of data collected and saved to the data stores 128. In other embodiments, the competency is manually determined by the client 150.

If it is determined, at the decision block 304, that the machine learning bot 104 is in Phase II, the machine learning bot 104 advances to block 308. At the block 308, the machine learning bot 104 can utilize the monitoring module 106 and the learning module 108 to collect data related to tuning adjustments made to an automated process, for example, a function performed by the AFTE bot 124, by the client 150. In some embodiments, the monitoring module 106 is monitoring all activity related to an automated process in which the machine learning bot 104 is designated to learn and can store all relevant data in the data stores 128. In some embodiments, this data can be collected from the logs 146 stored in the data stores 144 of the application server 140.

At block 310, data collected is analyzed using the analysis module 110 to discover non-value added steps, for example, sub-tasks of an automated process that increases overall transaction time. In some embodiments, the analysis can include several analytic processes, for example, Value Stream Added, deep dive and/or Takt methodologies. At block 312, the machine learning bot 104 determines if there is a tuning recommendation that could be implemented. For example, if during analysis the machine learning bot 104 has identified a sub-task that is unnecessary. If no tuning recommendation is found, the machine learning bot 104 iterates this cycle at the block 308 until a trigger is invoked, for example, an administrator ending the task.

At block 314, if the machine learning bot 104 has identified a tuning recommendation, the tuning recommendation is implemented. For example, if during analysis the machine learning bot 104 has identified a sub-task that is unnecessary, the machine learning bot 104 could recommend to the client 150, via the reporting and alert module 138, to remove the unnecessary step in order to reduce transaction time for a given task. In some embodiments, the client 150 can utilize the tuning module 136 to make tuning adjustments to the instruction set 126 of an automated process, for example, a function performed by the AFTE bot 124, as recommended by the machine learning bot 104. In other embodiments, the client 150 can review and approve recommended tuning adjustments, thereby allowing the machine learning bot 104 to access the tuning module 136 to make the required adjustments to the instruction set 126 of an automated process such as, for example, a function performed by the AFTE bot 124. In some embodiments, the machine learning bot 104 can identify transactions that are accruing large amounts of time and/or resources and can recommend changes to the instruction set 126 to eliminate excess time and/or resources for given tasks. In some embodiments, the machine learning bot 104 iterates this cycle at the decision block 304 until the machine learning bot 104 has reached a predetermined competency level or another trigger is invoked, for example, an administrator ending the task. In some embodiments, the competency level is determined by the amount of successful tuning recommendations the machine learning bot 104 has implemented in an automated process in which the machine learning bot 104 is designated to learn and tune. In other embodiments, the competency level is determined by the amount of spent in recommending tuning adjustments. In other embodiments, the competency is manually determined by the client 150. From the block 314, the process 300 returns to the decision block 304 and proceeds as described above.

If it is determined, at the decision block 304, that the machine learning bot 104 is in Phase III, the machine learning bot 104 advances to block 316. At the block 316, the machine learning bot 104 can utilize the monitoring module 106 and the learning module 108 to collect data related to an automated process, for example, a function performed by the AFTE bot 124. In some embodiments, the monitoring module 106 is monitoring all activity related to an automated process in which the machine learning bot 104 is designated to learn and can store all relevant data in the data stores 128. In some embodiments, this data can be collected from the logs 146 stored in the data stores 144 of the application server 140.

At block 318, data collected is analyzed using the analysis module 110 to discover non-value added steps, for example, sub-tasks of an automated process that increase overall transaction time, via the same means as described with respect to the block 310. At decision block 320, the machine learning bot 104 determines if there is a tuning adjustment that could be implemented. For example, if during analysis the machine learning bot 104 has identified a sub-task that is unnecessary. If no tuning adjustment is found, the machine learning bot 104 iterates this cycle at the block 316 until a trigger is invoked, for example, an administrator ending the task.

At block 322, if the machine learning bot 104 has identified a tuning adjustment, for example, identifying an unnecessary step in order to reduce transaction time for a given task, the tuning adjustment is implemented via the tuning module 136 to make the required adjustments to the instruction set 126 of an automated process, for example, a function performed by the AFTE bot 124. In some embodiments, the machine learning bot 104 can identify transactions that are accruing large amounts of time and/or resources and can modify the instruction set 126 to eliminate excess time and/or resources for given tasks. In some embodiments, the machine learning bot 104 iterates this cycle at the block 316 until the machine learning bot 104 has determined that no further tuning adjustments are required or another trigger is invoked, for example, an administrator ending the task.

It should be appreciated that, although the process 300 is described as being performed with respect to a single machine learning bot in a single learning phase for a single task, in various embodiments, the process 300 can be repeated, or performed in parallel, by a plurality of machine learning bots at varying learning phases in regards to a plurality of tasks and/or functions. It should also be appreciated that the machine learning bot 104 can be run in parallel with different learning phases with respect to different automated tasks and/or functions. For example, the machine learning bot 104 can be simultaneously running in Phase I, II and/or III, or any combination thereof, for any give designated automated function and/or task in which the machine learning bot 104 is assigned.

In some embodiments, the learning phases can be fewer phases, for example, if data has already been collected from a previous learning bot, a newly deployed learning bot could utilize data previously-collected without relearning and reanalyzing the automated task. In other embodiments, phases can be broken down and/or expanded to one or more phases. For example, Phase I could include only data collection, Phase II could include only learning, Phase III could include only analysis, and so forth.

Figure 4:
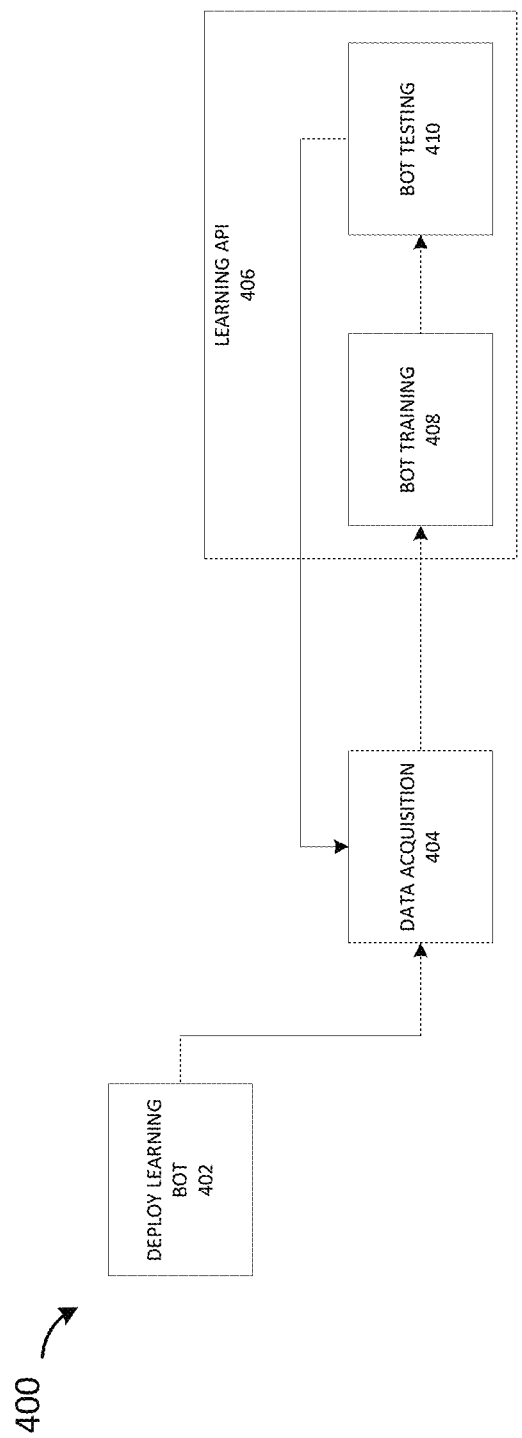
FIG. 4 illustrates an example high-level process of machine learning.

FIG. 4 illustrates an example high-level process 400 of machine learning that can be utilized by the machine learning bot 104 for learning an automated process in which the machine learning bot 104 is designated to learn. It should be appreciated that, although the process 400 is described as being performed with respect to a single machine learning bot and a single task, in various embodiments, the process 400 can be repeated, or performed in parallel, by a plurality of machine learning bots within a given system and/or a plurality of tasks and/or functions.

At block 402, the machine learning bot 104 is deployed onto the system of bots 102. In some embodiments, the bot deployment module 134 can be utilized to deploy the machine learning bot 104. In other embodiments, the machine learning bot 104 can be deployed in a standalone configuration, wherein the machine learning bot 104 is monitoring a single automated process. At block 404, data is collected from, for example, the logs 146 residing in the data stores 144. In some embodiments, the data is collected from the data store 128. In further embodiments, the data is collected real-time by monitoring all related data transmitted via the network 148, in the same manner as discussed above with respect to the monitoring module 106 of the machine learning bot 104.

Block 406 represents a learning API 406. In some embodiments, for example, and not by way of limitation, the learning API 406 can implement association rule learning, Naive Bayes, Decision Tree, K-Nearest Neighbors (K-NN), Neural Networks, and the like. Furthermore, in some embodiments, the learning API 406 can utilize, potentially in combination with one or more of the above-described learning algorithms, item-based and/or user-based collaborative filtering. In some embodiments, the learning API 406 can be other methods derived from dimensionality reduction, ensemble learning, instance-based algorithm, regression analysis, regularization algorithm, classifiers, and the like. In some embodiments, the learning API can be a combination of APIs.

At block 408 the machine learning bot 104 enters into a bot training mode. In some embodiments, the training is a "warm-up" training wherein a preconfigured dataset is utilized to initiate the learning phase. In some embodiments, real-time training is utilized to analyze actual data collected from an automated process, for example, the AFTE bot 124. In some embodiments, effectiveness training is utilized to analyze the results of implemented tuning collected at, for example, the blocks 308 or 316 of the process 300.

At block 410 the machine learning bot 104 enters into a bot testing mode. In certain embodiments, the testing comprises, identifying and perfecting algorithms based on relevant data collected at, for example, at the blocks 306, 308 and/or 316 of FIG. 3 of the process 300. In some embodiments, the machine learning bot 104 iterates this cycle at the block 404 until the machine learning bot 104 has reached a predetermined competency level or another trigger is invoked, for example, an administrator ending the task. In some embodiments, the competency level is determined by the amount of time the machine learning bot 104 has spent learning an automated process in which the machine learning bot 104 is designated to learn. In other embodiments, the competency level is determined by the amount of data collected regarding an automated process in which the machine learning bot 104 is designated to learn. In other embodiments, the competency is manually determined by the client 150.

Figure 5:
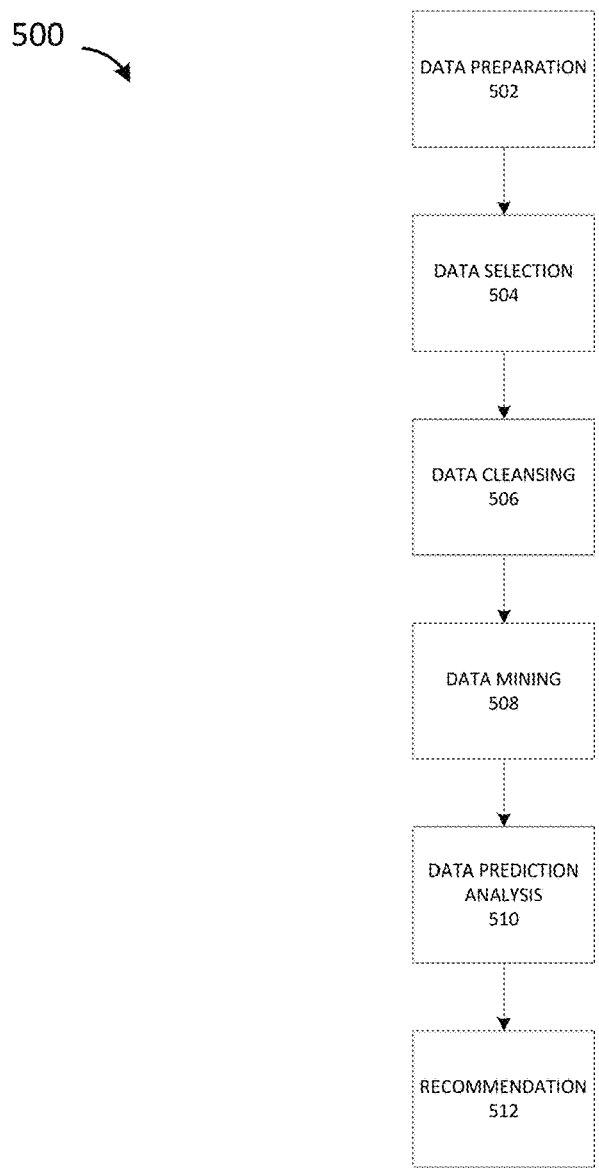
FIG. 5 illustrates an example of a process for monitoring, learning and recommending.

FIG. 5 illustrates an example of a process 500 for monitoring, learning and recommending that can be performed by the machine learning bot 104. In various embodiments, all or part of the process 500 can be performed as all or part of, for example, each of the blocks 306, 308-310 and 318-320 of the process 300 of FIG. 3. For illustrative purposes, the process 500 will be described relative to an example of association rule learning.

Figures 6A, 6B:
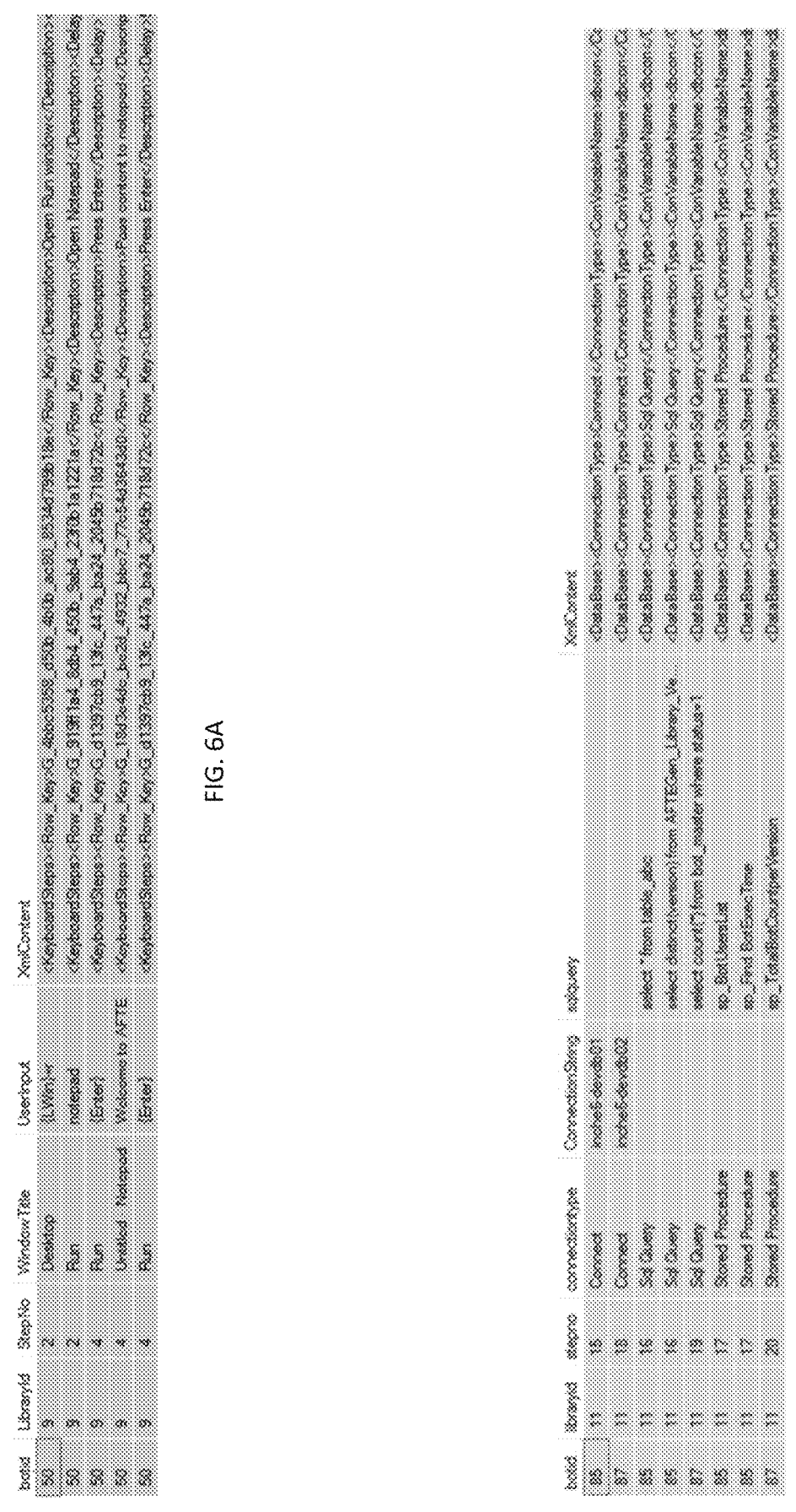

At block 502, the machine learning bot 104 prepares data. The preparation of data can, in some cases, include collecting the data and formatting the data, for example, by converting input data into table data. In some embodiments, additional data can be stored as XML data in a single column in consideration of space management. The data can be collected and/or prepared, for example, via an XML file. Example data that can be collected is shown in FIGS. 6A and 6B. FIG. 6A illustrates an example of keyboard library data. FIG. 6B illustrates an example of database library data.

At block 504, the machine learning bot 104 performs data selection, for example, from the prepared data from the block 502. In general, the block 504 can involve selecting data that will be used for tuning recommendations. In various cases, the machine learning bot 104 can select all of the prepared data such as, for example, the data shown in FIG. 6A and/or FIG. 6B. In other cases, the machine learning bot 104 can select a subset of columns that excludes certain columns such as, for example, the "XmlContent" column shown in each of FIGS. 6A and 6B. In some embodiments, the data selection can include selection of a particular column, such as "WindowTitle" as shown in FIG. 6A, that is a point of focus for a tuning recommendation. In these embodiments, the selection of the particular column can be based on user input.

At block 506, the machine learning bot 104 performs data cleansing, for example, of the selected data from the block 504. The block 506 can involve, for example, the machine learning bot detecting and correcting (or removing) corrupt or inaccurate records from a record set, table or database. In an example, a script can remove null values and duplicate values. If a particular column has been selected for a tuning recommendation, such as "WindowTitle" as shown in FIG. 6A, filters to retain "WindowTitle" values along with a configurable set of other columns, and remove unwanted data, can be configurably applied.

At block 508, the machine learning bot 104 performs data mining. In general, the data mining at the block 508 can involve finding relationships between the data and transforming the data into a transaction dataset. The finding and transforming can involve determining each combination of steps that appear together, where each combination is considered a transaction in the transaction dataset, so as to facilitate later analysis regarding how often such combinations are repeated in the transaction dataset. The transaction dataset can serve as a created model for association rule learning. In some embodiments, these combinations can be categorized, for example, by frequency or other criteria. In some embodiments, a result of the block 508 can be a matrix that represents the transaction dataset.

At block 510, the machine learning bot 104 performs data prediction analysis, for example, on the transaction dataset from the block 508. In certain embodiments, at the block 510, the machine learning bot 104 can iterate through each candidate association rule that can be formed from the transaction dataset resulting from the block 508. The association rules can be represented in "IF-THEN" format, with an antecedent in an "IF" or left-hand-side portion and a consequent in a "THEN" or right-hand-side portion. For each candidate association rule, support, confidence and lift can be computed using, for example, Equation 1, Equation 2 and Equation 3, respectively. Equations 1, 2 and 3 are shown below assuming an antecedent X and a consequent Y and where N represents a total number of transactions. In certain embodiments, the block 510 can include pruning or removing rules that fail to satisfy configurable minimum thresholds for support, confidence and/or lift.

$$\text{Support}(X) = \frac{\text{Frequency}(X)}{N} \quad \text{Equation 1}$$

$$\text{Confidence}(X \to Y) = \frac{\text{Support}(X \cup Y)}{\text{Support}(X)} \quad \text{Equation 2}$$

$$\text{Lift}(X \to Y) = \frac{\text{Support}(X \cup Y)}{\text{Support}(X) * \text{Support}(Y)} \quad \text{Equation 3}$$

At block 512, the machine learning bot 104 generates one or more recommendations. In certain embodiments, the block 512 can include sorting and ranking the association rules from block 510, for example, by support, confidence, lift, a weighted combination of one or more of the foregoing, and/or the like. Each recommendation can correspond to a consequent of a corresponding association rule. An output of the block 512 can be a single recommendation, a top-N list, combinations of the foregoing and/or the like. In an example, with reference to FIG. 6A, the most often repeated keyboard steps could be listed in their frequency order along with "WindowTitle," "UserInput" and potentially a delay value. In some embodiments, this result is further filtered based on user input data, if any, such as, for example, a particular column of interest for recommendations as described previously. For example, if user input indicates a desire for a recommendation for a "WindowTitle" value of "RUN," the most repeated records with that value can be listed along with potentially a delay value.

Figure 7:
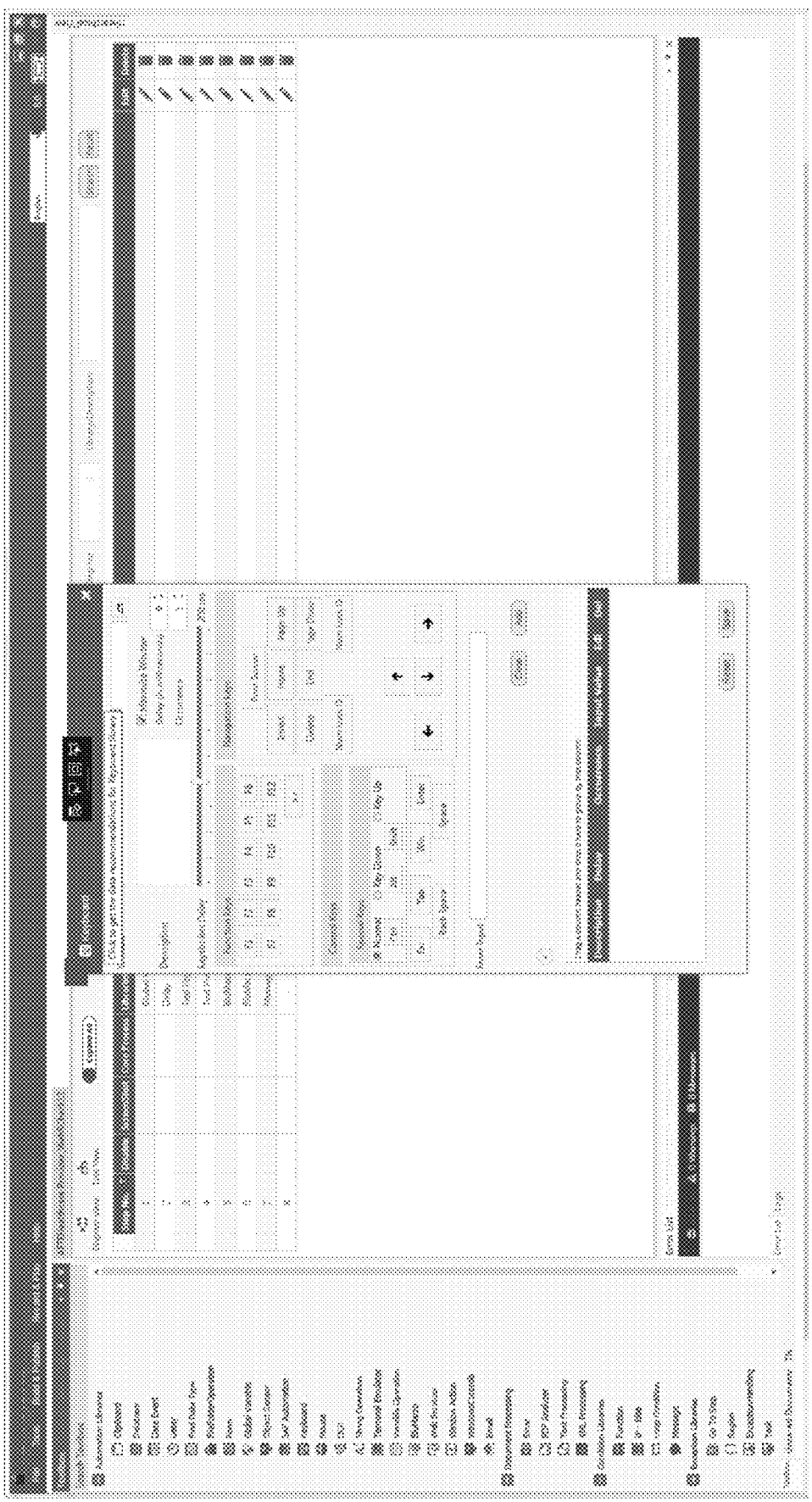
FIGS. 7-10 illustrate examples using the keyboard library data shown in FIG. 6A.
Figure 8:
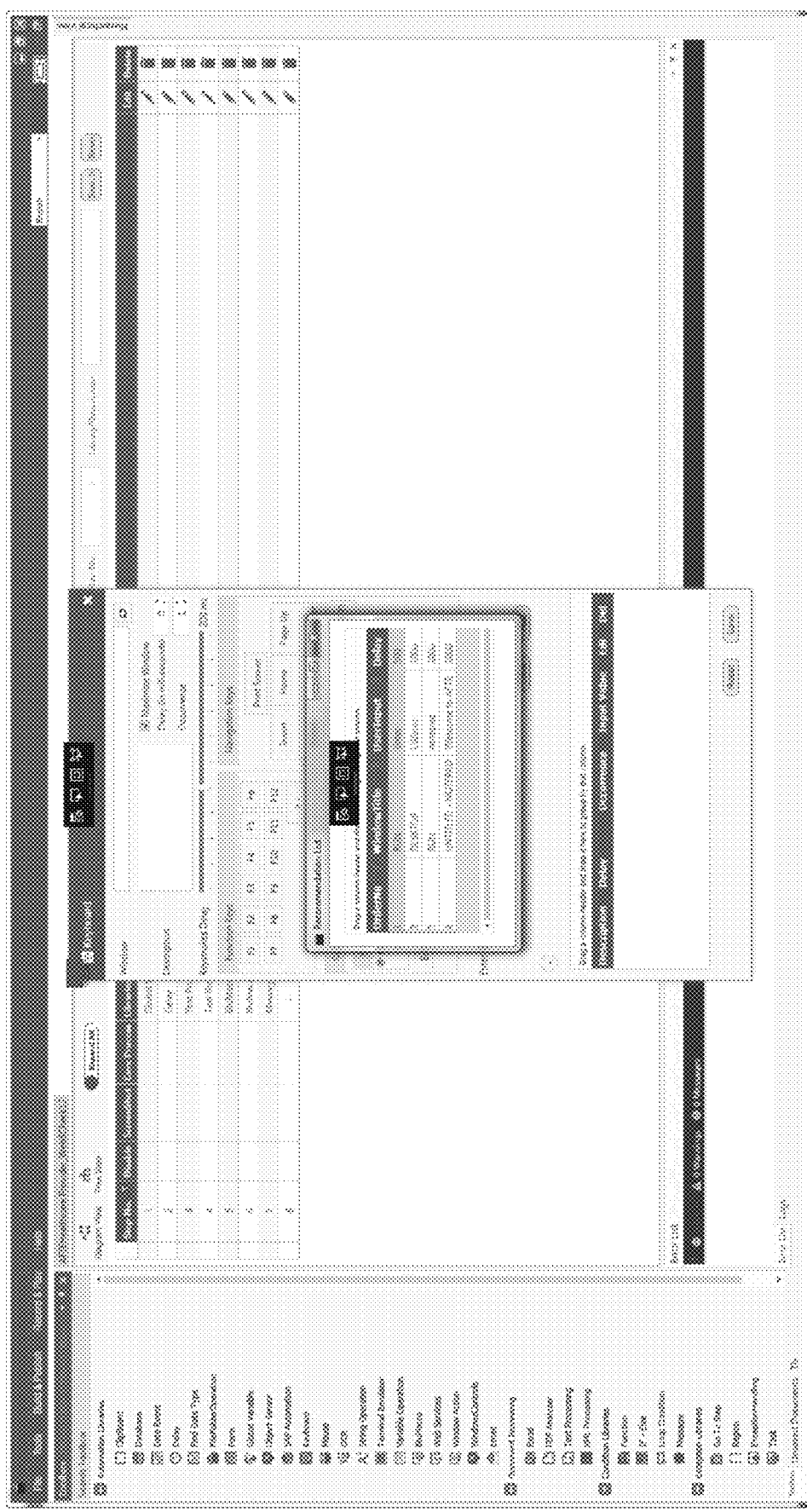
Figure 9:
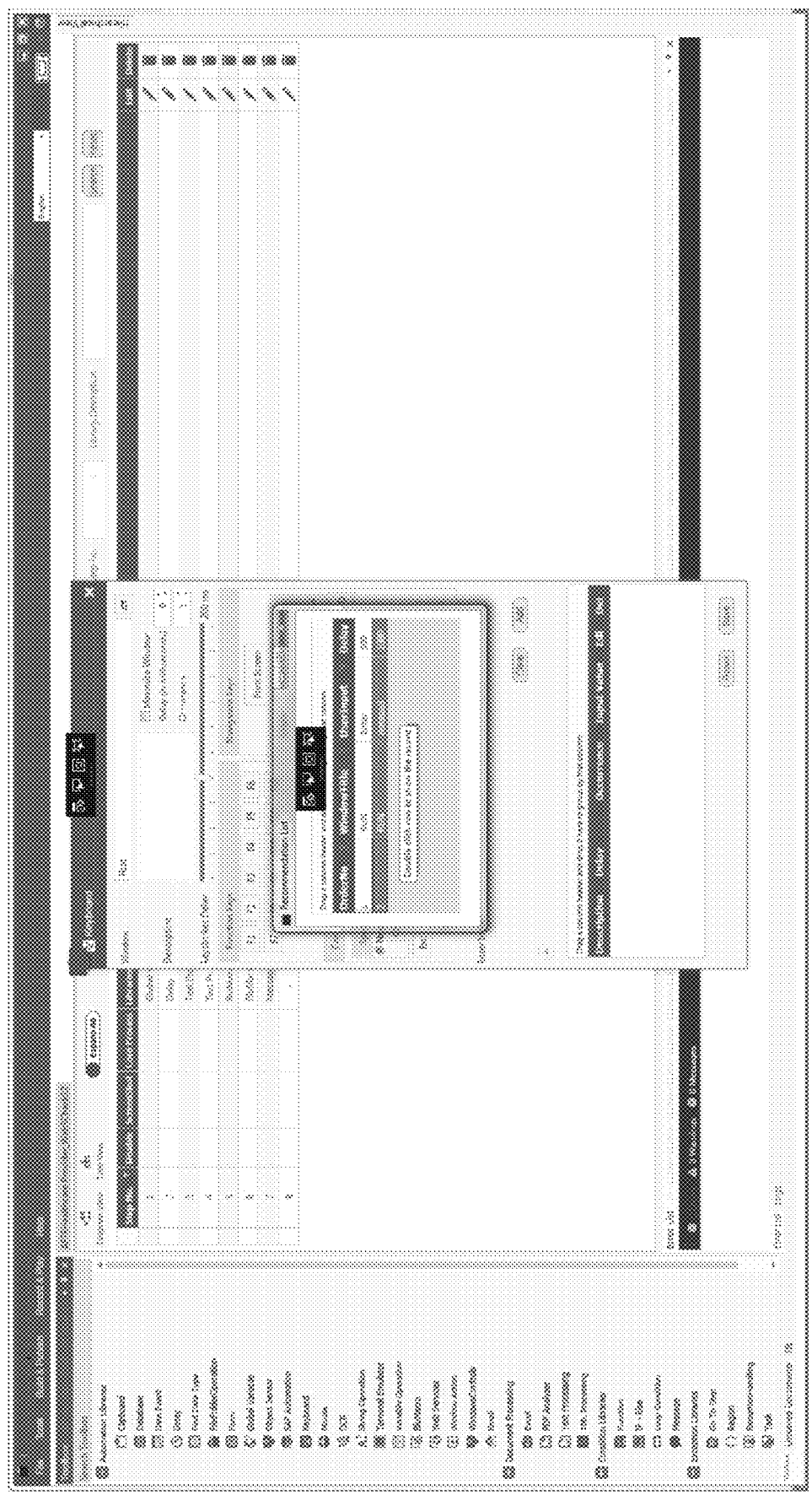
Figure 10:
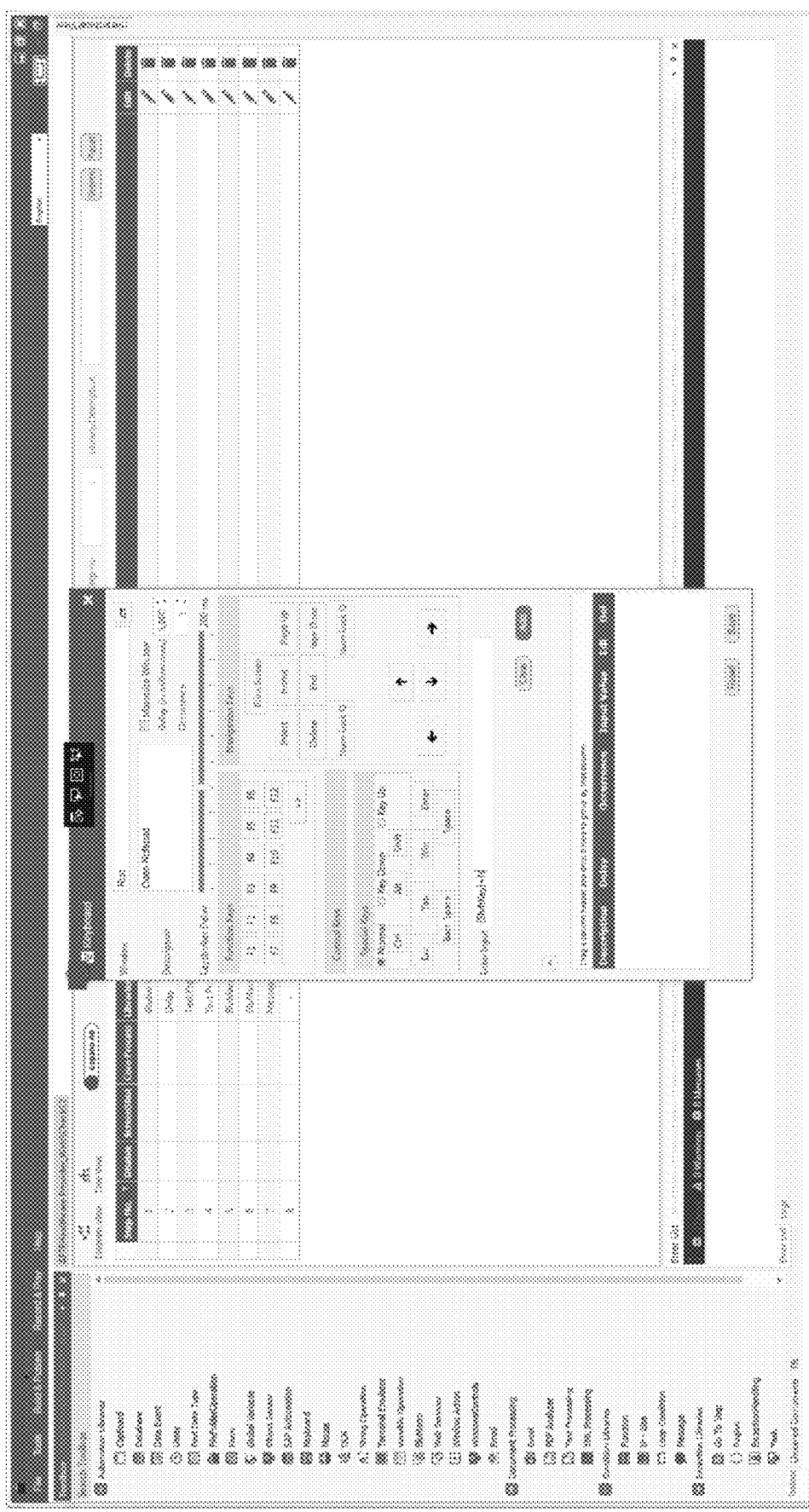
Figure 11:
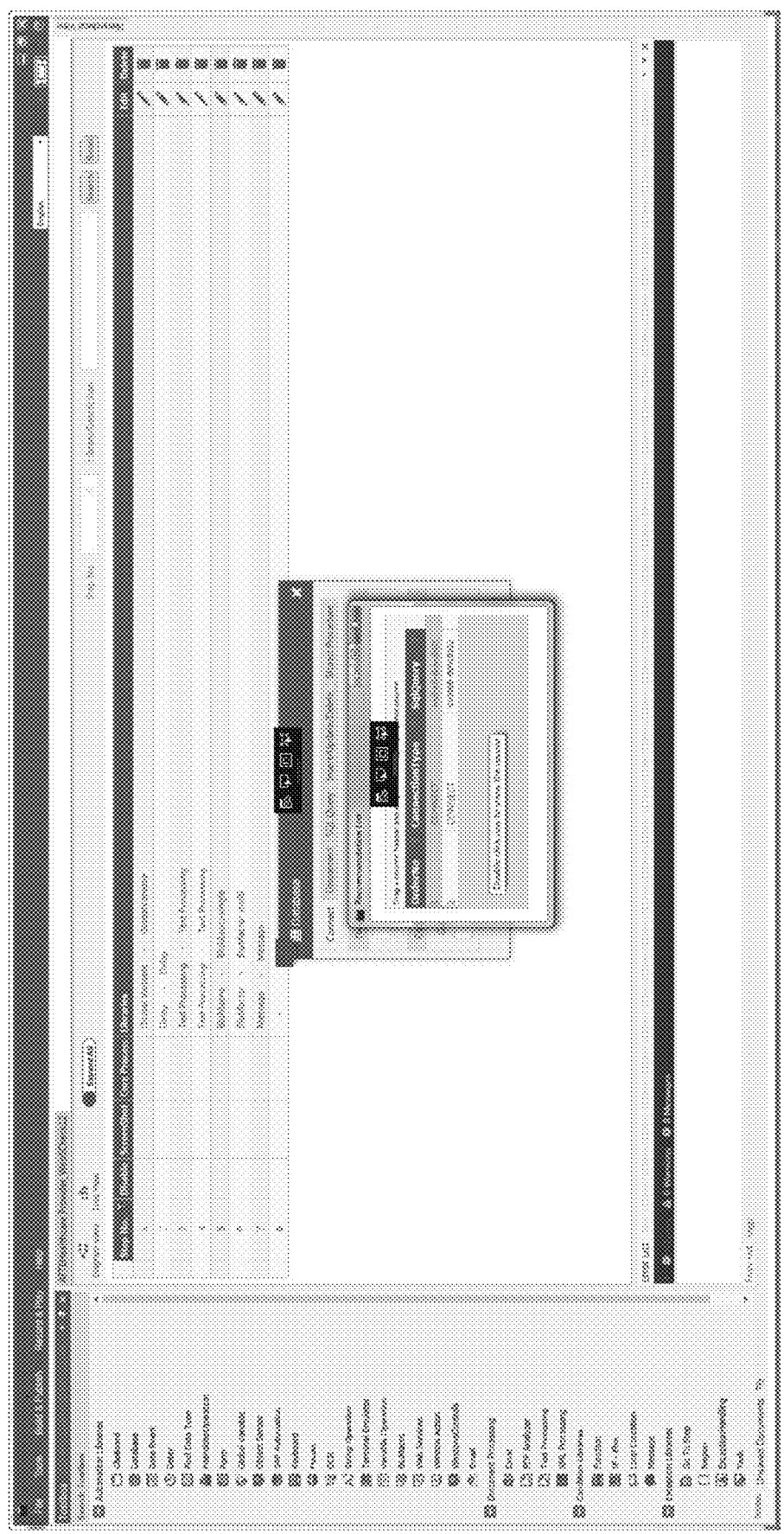
FIGS. 11-14 illustrate examples using the database library data shown in FIG. 6B.

FIGS. 7-10 illustrate examples using the keyboard library data shown in FIG. 6A. FIG. 7 illustrates an interface to request a data recommendation for the keyboard library. FIG. 8 illustrates an example of outputting resulting recommendations as a top-N list. FIG. 9 illustrates the recommendations from FIG. 8 after applying a filter that specifies a "WindowTitle" value of "RUN." FIG. 10 illustrates an interface showing a selected recommendation from FIG. 9.

Figure 12:
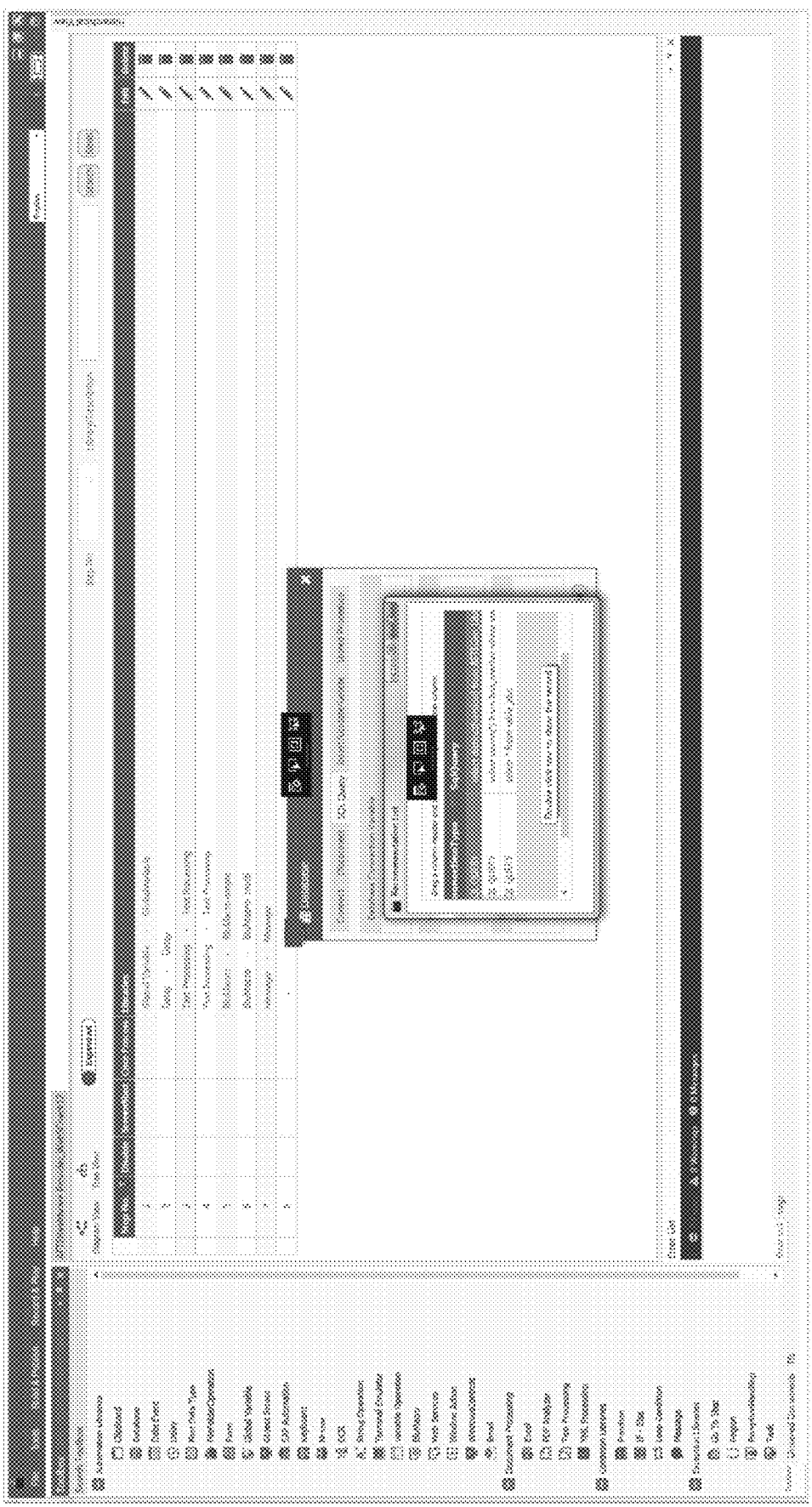
Figure 13:
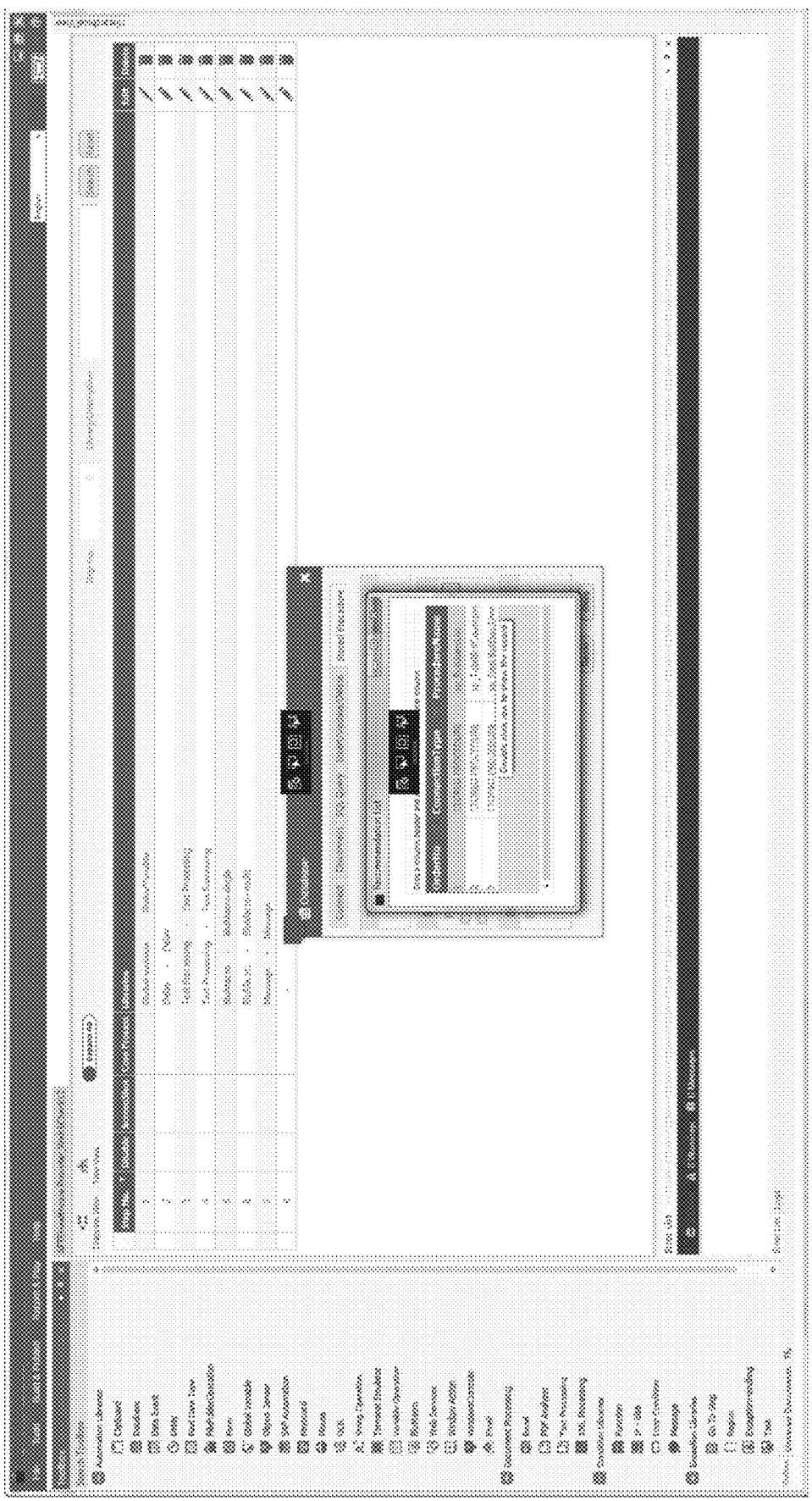
Figure 14:
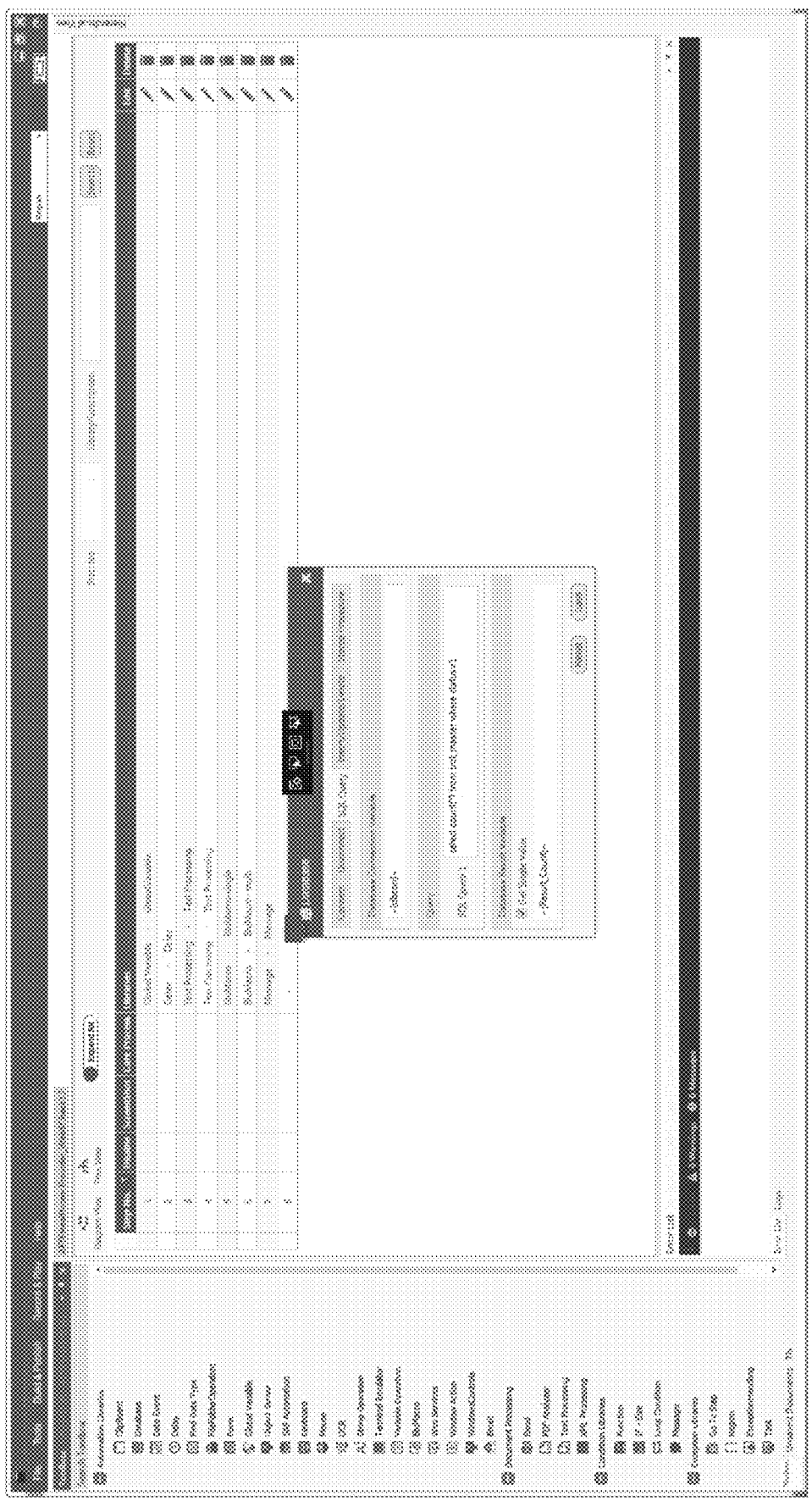

FIGS. 11-14 illustrate examples using the database library data shown in FIG. 6B. FIG. 12 illustrates an example of outputting resulting recommendations for connections as a top-N list. FIG. 12 illustrates an example of outputting resulting recommendations for queries as a top-N list. FIG. 13 illustrates an example of outputting resulting recommendations for stored procedures as a top-N list. FIG. 14 illustrates an interface showing a selected query recommendation from FIG. 12.

In certain embodiments, item-based collaborative filtering can be further utilized for recommendations. For example, in an embodiment, the machine learning bot 104 can show a list of frequently used steps for a particular bot or a particular bot region, or a list of inner steps that perform a complete action. In some cases, such steps can be shown when a bot is created. In addition, or alternatively, frequently used library data can be shown during such a process. In an example, a variable can be defined or assigned a value based on a corresponding variable in a variable library. In a more specific example, a database connection variable can be defined or assigned a value based on a corresponding variable in the variable library.

In certain embodiments, user-based collaborative filtering can be further utilized for recommendations. A user-based collaborative filtering recommendation algorithm can be based on a first user involved in a first project, where data and steps are stored in a user-centric manner. When a similar new project is created and a second user starts developing it, that second user can receive recommendations from the user-centric data in light of the first project. It should be appreciated that, in some cases, the second user creating the new project can, in fact, be the first user.

Figure 15:
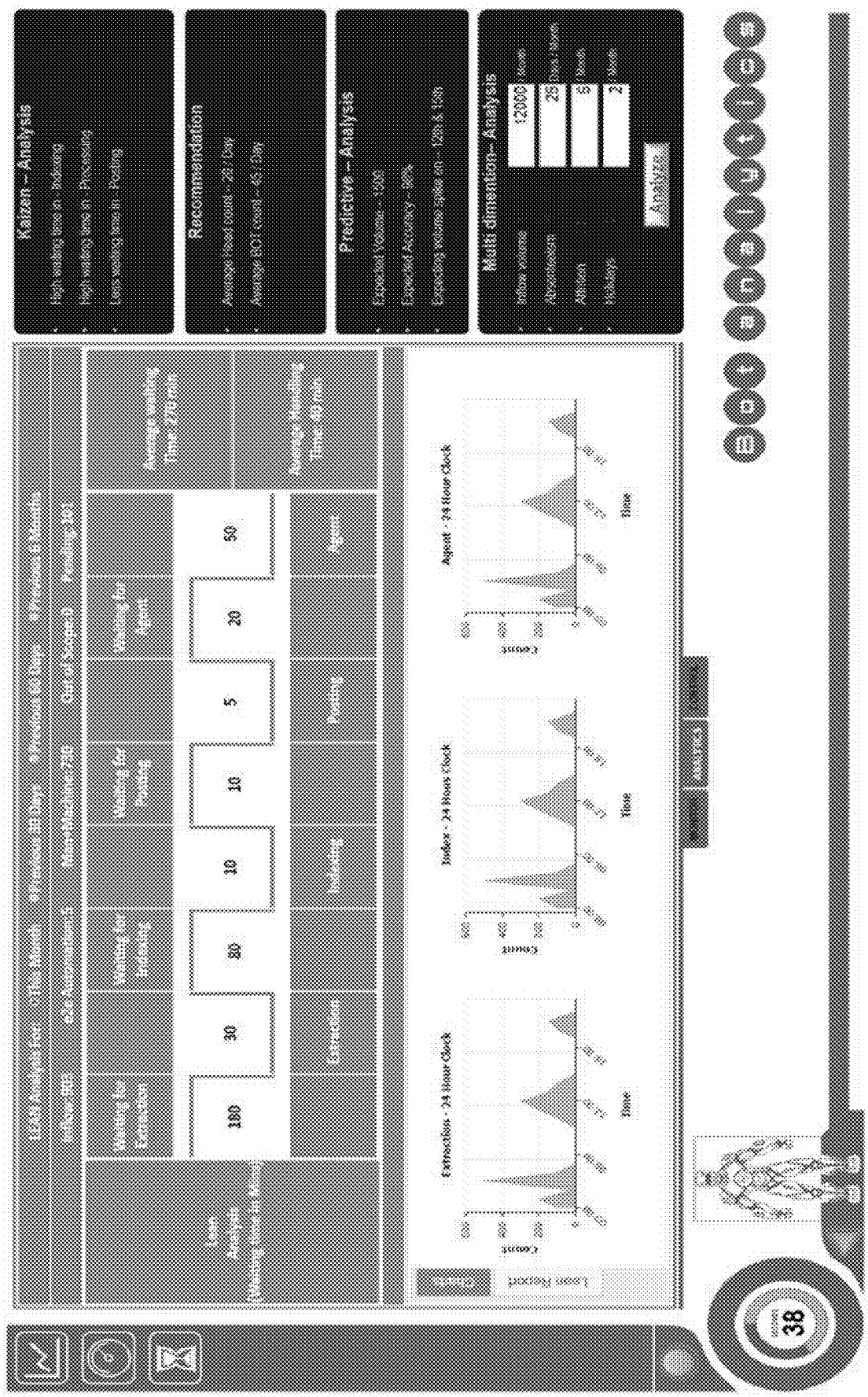
FIGS. 15-16 illustrate example reports provided by a machine learning bot.
Figure 16:
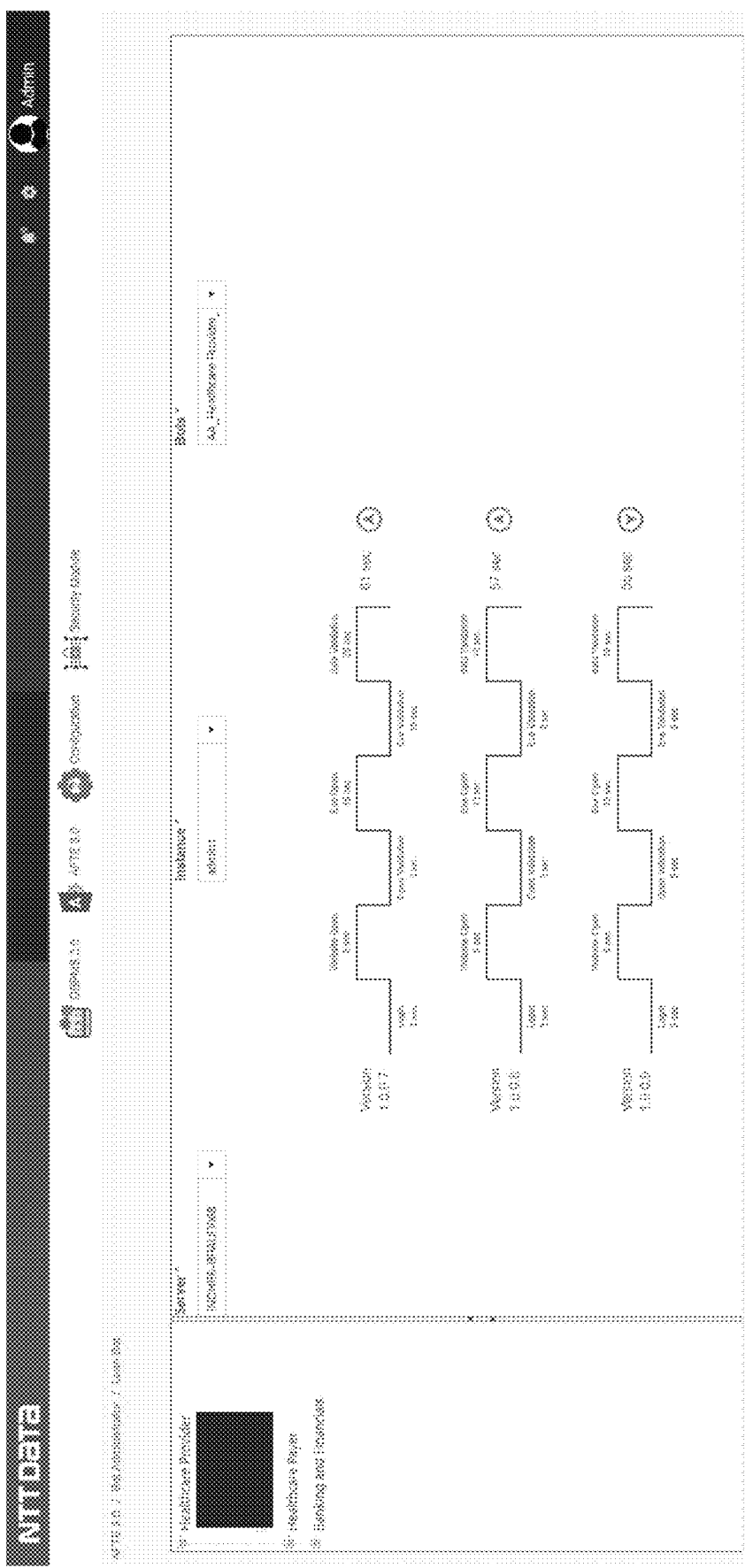

FIGS. 15-16 illustrate example reports provided by the machine learning bot 104. In some embodiments, the report is generated via the reporting and alert module 138. In some embodiments, the report is generated at pre-determined time intervals, on pre-determined triggers, and/or real-time. In other embodiments, the client 150 can access the report from the reporting and alert module 138 within the bot control system 130 via the network 148. In further embodiments, the reporting and alert module 138 provides a GUI interface that can be accessed by the client 150 to obtain the report.

In certain embodiments, the machine learning bot 104 can identify waiting time for each of a plurality of steps in a given transaction. For example, the machine learning bot 104 can identify waiting times during file extraction, indexing, processing and/or posting of files compared to the overall handling time of files. In certain embodiments, the machine learning bot 104 can use the data collected from the process 400, as an example, to recommend and/or automatically make adjustments to the instruction set 126 of the AFTE bot 124. In various embodiments, the report is utilized to modify a plurality of instruction sets for a plurality of AFTE bots performing the same automated task or other automated tasks, or a combination thereof.

In some embodiments, a score can be given to each automated task, for example, an automated task performed by the AFTE bot 124, and can be used to analyze and/or evaluate overall bot performance on a given system. In turn, the score can be utilized by the machine learning bot 104 to modify the instruction set 126 of the AFTE bot 124, based on a scoring of another AFTE bot analyzed by another machine learning bot.

Figure 17:
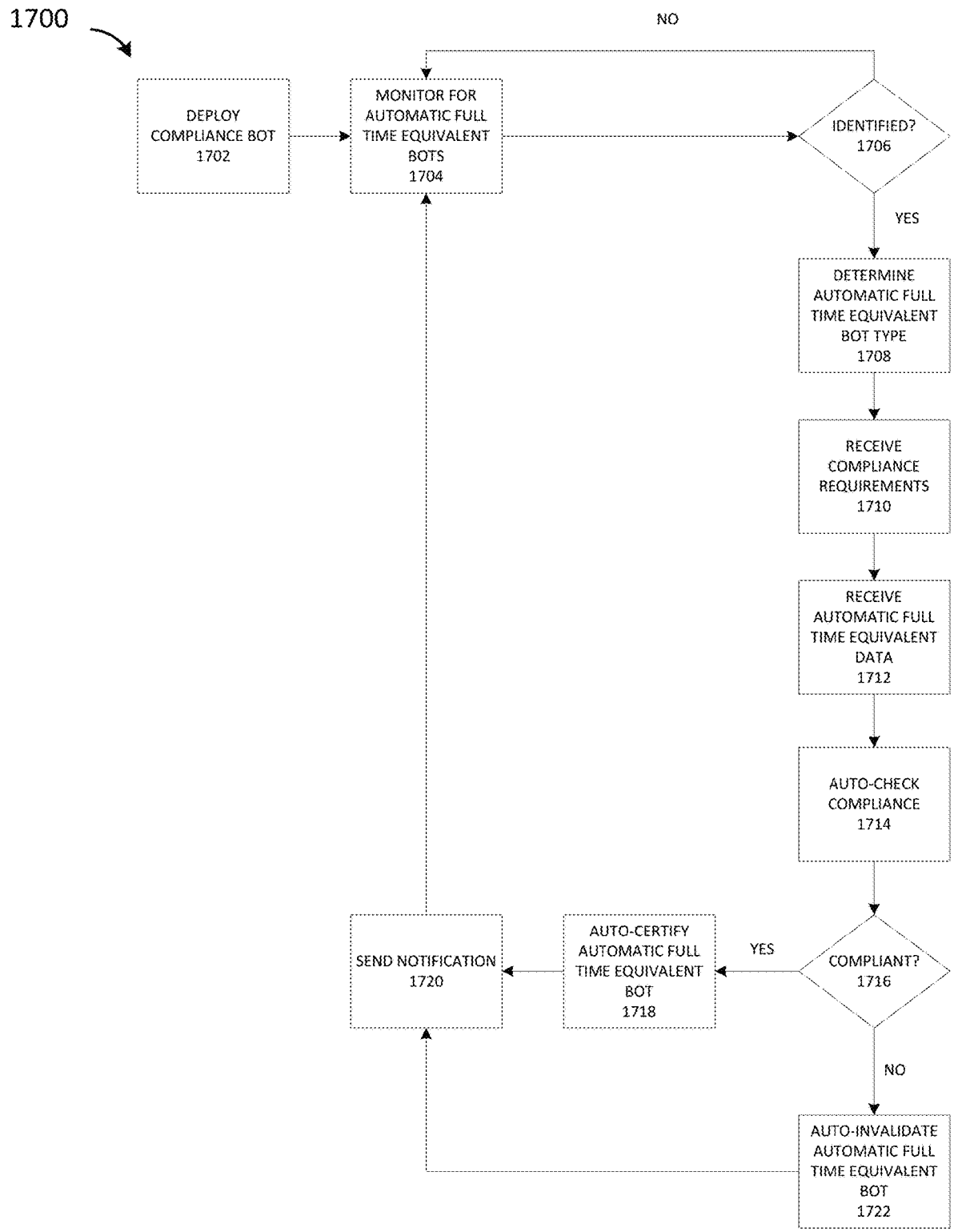
FIG. 17 illustrates an example process of the implementation of a compliance bot.
Figure 18:
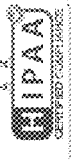
FIGS. 18-22 illustrate example compliance alerts.

FIG. 17 illustrates an example process 1700 of the implementation of the compliance bot 112. It should be appreciated that, although the process 1700 is described as being performed with respect to a single compliance bot and a single automated task performed by a single AFTE bot, in various embodiments, the process 1700 can be repeated, or performed in parallel, by a plurality of compliance bots within a given system and/or a plurality of automated tasks and/or functions performed by a plurality of AFTE bots.

At block 1702, the compliance bot 112 is deployed onto the system of bots 102. In some embodiments, the bot deployment module 134 can be utilized to deploy the compliance bot 112. In other embodiments, the compliance bot 112 can be deployed in a standalone configuration, wherein the compliance bot 112 is monitoring a single automated process performed, for example, by the AFTE bot 124. In other embodiments, the compliance bot 112 is one of a plurality of compliance bots deployed to monitor a single and/or plurality of automated tasks and/or functions for compliance.

At block 1704 the compliance bot 112 monitors, via the monitor module 116, for activity that is indicative of the AFTE bot 124 being deployed. In some embodiments, the compliance bot 112 monitors the logs 146 within the data stores 144 for any activity performed by the AFTE bot 124. In other embodiments, the compliance bot 112 monitors, via the monitor module 116, activity over the network 148 that is indicative of the AFTE bot 124 being utilized. In further embodiments, the client 150 designates the compliance bot 112 to monitor the AFTE bot 124. In some embodiments, the compliance bot 112 iterates this cycle at the block 1704 until the compliance bot 112 has identified the AFTE bot 124 and/or other automated processed, or another trigger is invoked, for example, an administrator ending the task.

At block 1708, after the compliance bot 112 has identified the presence of the AFTE bot 124 at a decision block 1706, the compliance bot 112 determines the type of automation the AFTE bot 124 is performing. In some embodiments, the compliance bot 112 determines the type of AFTE bot by, for example, a unique identifier supplied by the AFTE bot 124. In other embodiments, the compliance bot 112 determines the automation type of the AFTE bot 124 by the client 150, the application 142 and/or the application server 140. In some embodiments, the compliance bot 112 can utilize the logs 146 to determine the type of automated task.

At block 1710, determinant of the automation type, the compliance bot 112 retrieves the compliance rules 114 corresponding to the automation type. In some embodiments, the compliance bot 112 retrieves the compliance rules from the data stores 128 within the system of bots 102. In other embodiments, the client 150 can manually load the compliance rules 114 onto the compliance bot 112. In other embodiments, specific compliance bots are deployed with a particular set of compliance rules, which in some embodiments, would allow the specific compliance bot to monitor for a specific automated function and/or task. In this case, the compliance rules for the automation type can be retrieved from the particular set of compliance rules.

At block 1712, the compliance bot 112 retrieves data from the AFTE bot 124. In some embodiments, the compliance bot 112 can utilize the monitoring module 116 to collect data related to automation of the AFTE bot 124 from the logs 146 within the application server indicative of activity performed by the AFTE bot 124. In some embodiments, the monitoring module 106 is monitoring all activity over the network 148 that is allocated to the AFTE bot 124. In further embodiments, the compliance bot 112 and the AFTE bot 124 are deployed simultaneously within an isolated container, wherein the compliance bot 112 monitors the activity within the isolated container.

At block 1714, the compliance bot 112 automatically checks compliance of the AFTE bot 124, as determined by the compliance rules 114. In some embodiments, the compliance bot 112 verifies, via the access control module 118, that the AFTE bot 124 connects to the application server with adequate access control measures in place, for example, ensuring that unique user identifications are utilized, emergency access procedures are implemented, automatic logoffs are implemented, various combinations thereof and the like. In certain embodiments, the compliance bot 112 verifies, via the encryption and security control module 120, that the AFTE bot 124 connects to a resource, such as the application server 140, the application 142 and/or the data stores 144, utilizing the required encryption as determined by the compliance rules 114. In other embodiments, the compliance bot 112 audits the logs 146, via the auditing module 122, for activity indicative of the automated activity performed by the AFTE bot 124 to ensure proper encryption and security controls are in place. In some embodiments, the compliance bot 112 audits the logs 146 verifying connections are from, for example, a certain pre-determined internet protocol (IP) block and/or that the connections are on an authorized communications port. In some embodiments the compliance bot 112 can be configured to audit deployed automation processes, for example, the AFTE bot 124, based on domain-specific compliance.

At decision block 1716, the compliance bot 112 determines whether the AFTE bot 124 is in compliance. In some embodiments, the compliance bot 112 will review all relevant data collected from the AFTE bot 124 and reconcile that data with the compliance rules 114. In other embodiments, the compliance bot 112 will review the instruction set 126 of the AFTE bot 124 to determine if the AFTE bot 124 has a compliant configuration. In some embodiments, determinant that that AFTE bot 124 has a noncompliant instruction set, the compliance bot 112 can modify the instruction set 126 automatically in order to achieve compliance.

At block 1718, indicative of the AFTE bot 124 meeting all requirements as set forth in the compliance rules 114, the compliance bot 112 automatically certifying the AFTE bot 124. At block 1720, the compliance bot 112 can utilize the reporting and alert module 138 to send an alert to the client 150 that the AFTE bot 124 is in compliance with the required rule set as set forth in the compliance rules 114.

At block 1722, indicative of the AFTE bot 124 not meeting all requirements as set forth in the compliance rules 114, the compliance bot 112 automatically invalidates the AFTE bot 124. In certain embodiments, certification is a prerequisite to the AFTE bot 124 being published for use. In these embodiments, the block 1722 can, as a result of the non-certification, involve preventing the AFTE bot 124 from being published. In addition, or alternatively, particularly in cases in which the AFTE bot 124 is already published, the compliance bot 112 can automatically shut down and/or remove the AFTE bot 124 from operation. In other embodiments, the compliance bot 112 will automatically shut down and/or remove the AFTE bot 124 from operation, modify the instruction set 126 in order to achieve compliance, and redeploy the AFTE bot 124 via the bot deployment module 134.

In some embodiments, at the block 1722, the compliance bot 112, upon determining that the AFTE bot 124 is noncompliant, will determine to what degree the AFTE bot 124 is noncompliant and take appropriate action. For example, if the encryption and security control module 120 identifies that the instruction set 126 of the AFTE bot 124 has prioritized encrypted connections to the application server 140, but also allows for unencrypted connections, the compliance bot 112 can alert the client 150, via the reporting and alert module 138 of the potential noncompliance and allow the AFTE bot 124 to continue operation until compliance is broken.

At the block 1720, the compliance bot 112 can utilize the reporting and alert module 138 to send an alert to the client 150 that the AFTE bot 124 is compliant or noncompliant, as applicable, with the required rule set as set forth in the compliance rules 114. In some embodiments, the compliance bot 112 iterates this cycle at the block 1704 until the compliance bot 112 has received a trigger, for example, an administrator ending the task.

In some embodiments, the compliance bot 112 can be utilized to perform a compliance check on an automated process that has yet to be deployed. For example, the compliance bot 112 can review an instruction set prior to deployment for compliance, for example, the instruction set 126 of the AFTE bot 124. In certain embodiments, the compliance bot 112 can create an instruction set, for example, the instruction set 126 for the AFTE bot 124, based on a predetermined task to be performed by the AFTE bot 124. In some embodiments, the compliance bot 112 can continually validate potential AFTE bots that are in queue for deployment by the bot deployment module 134. In some embodiments, the compliance bot 112 is a part of the AFTE bot 124 and/or other automated processes on the application server 140, the application 142 and/or the network 148.

In some embodiments, the compliance bot 112 can act as a simulated AFTE bot to perform automated tasks while utilizing the compliance rules 114, the access control module 118, the encryption and security control module 120 and the auditing module 122, to verify the application server 140, the application 142 and the data stores 144 are in compliance. In some embodiments, the compliance bot 112 can actively monitor any automated process, for example, the AFTE bot 124 to determine if there is any deviation from the compliance rules 114. In further embodiments, the compliance bot 112 can actively monitor an automated process, for example, the AFTE bot 124 to determine if there has been a change in the instruction set 126 and automatically invalidate if there has been a change in the instruction set 126 that no longer complies with the applicable compliance rules. In certain embodiments, the compliance bot 112 can actively monitor changes to various compliance rules and upon determination that changes in the various compliance rules have occurred, the compliance bot 112 can then automatically check compliance of automated processes that rely on the various changed compliance rules.

Figure 19:
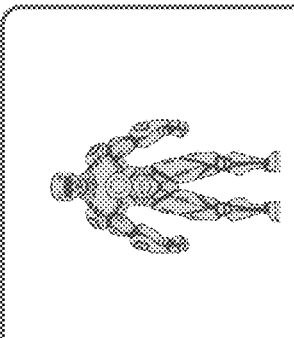
Figure 20:
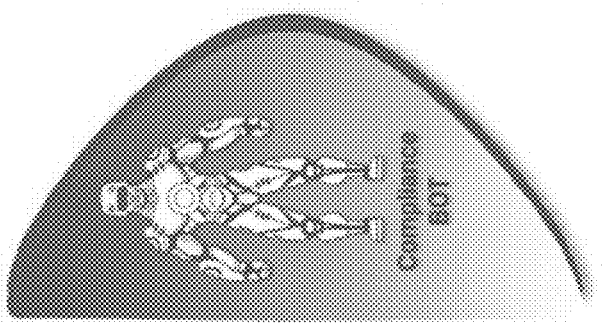
Figure 21:
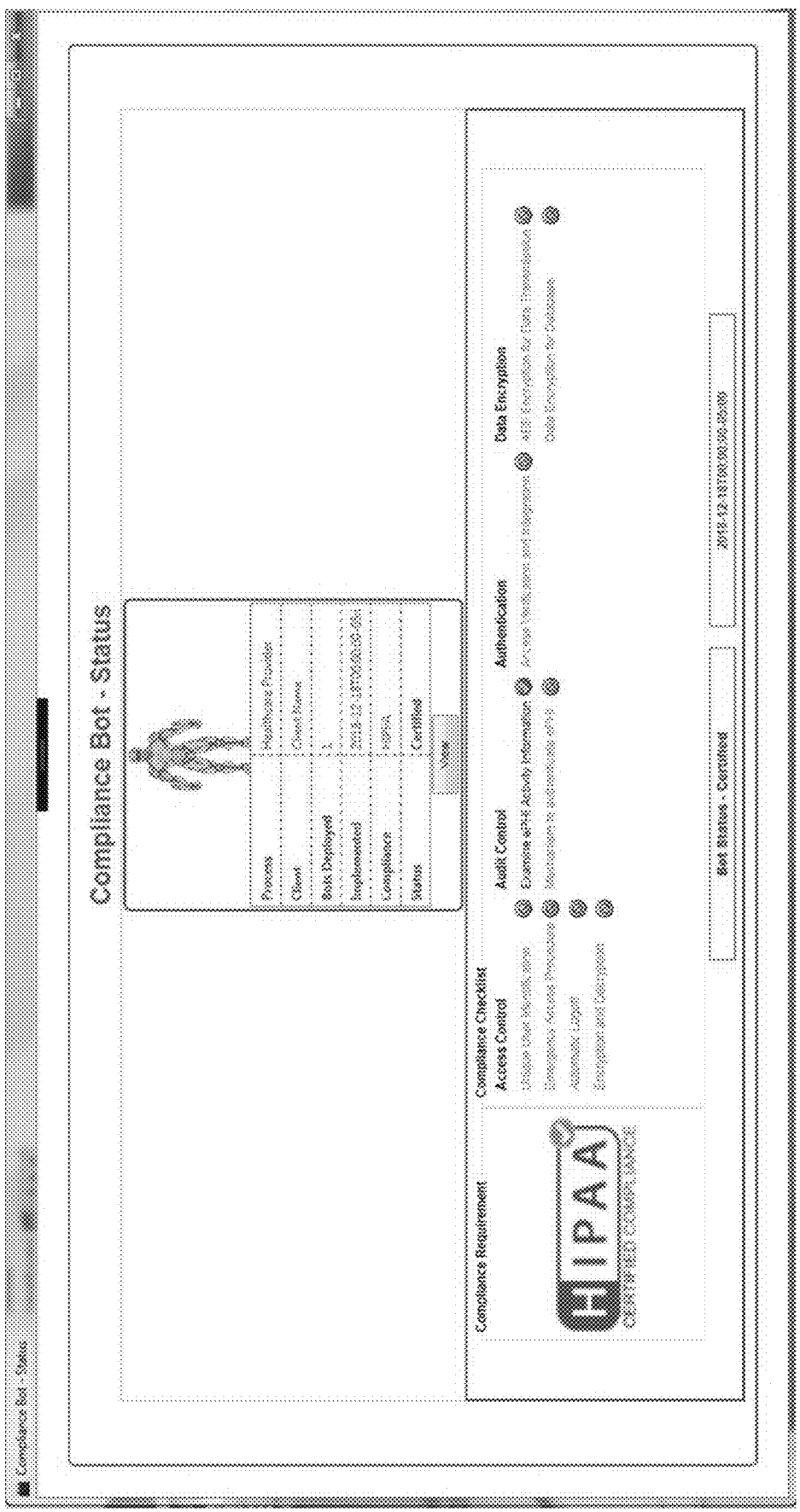

FIGS. 18-22 illustrate example compliance alerts. FIG. 19, in particular, is an example of a dashboard view of compliance alerts. In some embodiments, the compliance alert is created by the compliance bot 112 via the reporting and alert module 138 within the bot control system 130. In some embodiments, the alert is sent to the client 150 and/or available via the reporting and alert module 138 within the bot control system 130 to any device connected to the network 148. In other embodiments, the alert can be sent via electronic mail and/or any other electronic alert medium, including but not limited to, RSS feeds, push notifications and the like. In some embodiments, the compliance bot 112 can automatically deploy an automated task, for example, the AFTE bot 124 via the bot deployment module 134 upon determining that the instruction set 126 of the AFTE bot 124 is in compliance with the compliance rules 114 required for a given task.

Figure 22:
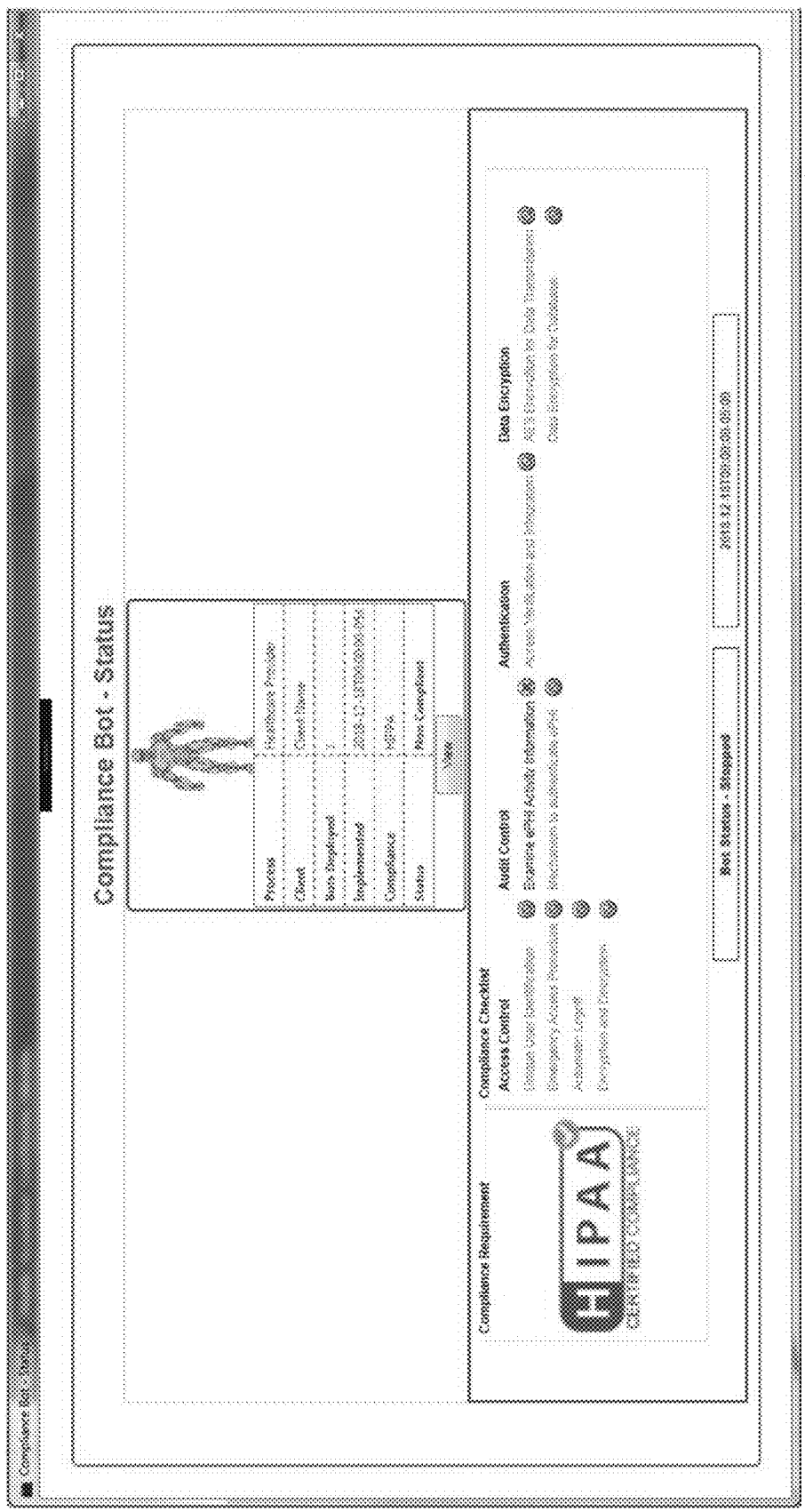

By way of more particular example, with reference to FIG. 22, a bot for a healthcare process has been deployed without clearing a patient name which was copied to clipboard. The compliance bot 112 has selected the bot for a certification process. According to this example, while examining sensitive information or data handled by the bot, electronic protected health information (ePHI) activity information in this example, the bot has failed to meet a corresponding standard because ePHI information, the patient name in this example, was not cleared from an electronic clipboard after bot execution. Therefore, according to this example, the bot is deemed non-compliant with the failed criteria highlighted. In certain embodiments, the bot can be sent back to the AFTE bot creation module 132, for example, to add a new step to clear the clipboard, after which time the bot can be again deployed and the compliance bot 112 can re-perform the certification process. If the bot satisfies all the criteria required by an applicable standard, the status of the bot can be set to certified or compliant. At this point, the bot can be published.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
    deploying a learning bot onto a system of bots, wherein the learning bot monitors a first bot of the system of bots, the first bot executing a first automated process;
    determining a learning phase of the learning bot, wherein the learning bot utilizes a plurality of learning phases comprising:
        a first learning phase in which manual fine tuning of the first automated process occurs, such that, while in the first learning phase, the learning bot monitors and learns from manual tuning activity performed by a user of a client computer system;
        a second learning phase in which assisted fine tuning of the first automated process occurs, such that the learning bot monitors and learns from the manual tuning activity performed by the user of the client computer system and recommends to the user of the client computer system that one or more tuning adjustments to be made to the first automated process; and
        a third learning phase in which automated fine tuning of the first automated process occurs, such that the learning bot automatically makes at least one tuning adjustment to the first automated process;
    responsive to a determination that the learning bot is in the third learning phase, the learning bot:
        monitoring activity related to the first automated process;
        collecting data related to the monitored activity;
        analyzing at least a portion of the collected data;
        identifying an automatic tuning adjustment responsive to the analyzing; and
        automatically making the automatic tuning adjustment to the first automated process.

2. The method of claim 1 comprising, responsive to a determination that the learning bot is in the first learning phase:
    monitoring activity related to the first automated process;
    collecting data related to the monitored activity;
    collecting data related to user tuning adjustments to the first automated process; and
    storing, in a data store, at least a portion of the data related to the monitored activity and at least a portion of the data related to the user tuning adjustments.

3. The method of claim 1 comprising, responsive to a determination that the learning bot is in the second learning phase:
    monitoring activity related to the first automated process;
    collecting data related to the monitored activity;
    collecting data related to user tuning adjustments to the first automated process;
    storing, in a data store, at least a portion of the data related to the monitored activity and at least a portion of the data related to the user tuning adjustments;
    analyzing at least a portion of the collected data related to the monitored activity;
    identifying a tuning recommendation based, at least in part, on the analyzing; and
    implementing the tuning recommendation.

4. The method of claim 1, wherein the learning bot monitors a single automated process.

5. The method of claim 1, wherein the learning bot monitors multiple automated processes.

6. The method of claim 1, comprising deploying a plurality of learning bots that each monitor different automated processes.

7. The method of claim 1, wherein the learning bot resides in more than one of the plurality of learning phases at a given time.

8. The method of claim 7, wherein the learning bot resides in the first learning phase as to a first tuning adjustment, in the second learning phase as to a second tuning adjustment, and in the third learning phase as to a third tuning adjustment.

9. The method of claim 1, wherein:
    the analyzing comprises identifying at least one task of the first automated process as a non-value-added step; and
    the automatic tuning adjustment comprises removal of the at least one task from the first automated process.

10. A computer system comprising a processor and memory, wherein the processor and the memory in combination are operable to implement a method comprising:
    deploying a learning bot onto a system of bots, wherein the learning bot monitors a first bot of the system of bots, the first bot executing a first automated process;
    determining a learning phase of the learning bot, wherein the learning bot utilizes a plurality of learning phases comprising:
        a first learning phase in which manual fine tuning of the first automated process occurs, such that, while in the first learning phase, the learning bot monitors and learns from manual tuning activity performed by a user of a client computer system;
        a second learning phase in which assisted fine tuning of the first automated process occurs, such that the learning bot monitors and learns from the manual tuning activity performed by the user of the client computer system and recommends to the user of the client computer system that one or more tuning adjustments to be made to the first automated process; and
        a third learning phase in which automated fine tuning of the first automated process occurs, such that the learning bot automatically makes at least one tuning adjustment to the first automated process;

responsive to a determination that the learning bot is in the third learning phase, the learning bot:
monitoring activity related to the first automated process;
collecting data related to the monitored activity;
analyzing at least a portion of the collected data;
identifying an automatic tuning adjustment responsive to the analyzing; and
automatically making the automatic tuning adjustment to the first automated process.

11. The computer system of claim 10, the method comprising, responsive to a determination that the learning bot is in the first learning phase:
monitoring activity related to the first automated process;
collecting data related to the monitored activity;
collecting data related to user tuning adjustments to the first automated process; and
storing, in a data store, at least a portion of the data related to the monitored activity and at least a portion of the data related to the user tuning adjustments.

12. The computer system of claim 10, the method comprising, responsive to a determination that the learning bot is in the second learning phase:
monitoring activity related to the first automated process;
collecting data related to the monitored activity;
collecting data related to user tuning adjustments to the first automated process;
storing, in a data store, at least a portion of the data related to the monitored activity and at least a portion of the data related to the user tuning adjustments;
analyzing at least a portion of the collected data related to the monitored activity;
identifying a tuning recommendation based, at least in part, on the analyzing; and
implementing the tuning recommendation.

13. The computer system of claim 10, wherein the learning bot monitors a single automated process.

14. The computer system of claim 10, wherein the learning bot monitors multiple automated processes.

15. The computer system of claim 10, the method comprising deploying a plurality of learning bots that each monitor different automated processes.

16. The computer system of claim 10, wherein the learning bot resides in more than one of the plurality of learning phases at a given time.

17. The computer system of claim 16, wherein the learning bot resides in the first learning phase as to a first tuning adjustment, in the second learning phase as to a second tuning adjustment, and in the third learning phase as to a third tuning adjustment.

18. The computer system of claim 10, wherein:
the analyzing comprises identifying at least one task of the first automated process as a non-value-added step; and
the automatic tuning adjustment comprises removal of the automated task from the first automated process.

19. A computer-program product comprising a non-transitory computer-usable medium having computer-readable program code embodied therein, the computer-readable program code adapted to be executed to implement a method comprising:
deploying a learning bot onto a system of bots, wherein the learning bot monitors a first bot of the system of bots, the first bot executing a first automated process;
determining a learning phase of the learning bot, wherein the learning bot utilizes a plurality of learning phases comprising:
a first learning phase in which manual fine tuning of the first automated process occurs, such that, while in the first learning phase, the learning bot monitors and learns from manual tuning activity performed by a user of a client computer system;
a second learning phase in which assisted fine tuning of the first automated process occurs, such that the learning bot monitors and learns from the manual tuning activity performed by the user of the client computer system and recommends to the user of the client computer system that one or more tuning adjustments to be made to the first automated process; and
a third learning phase in which automated fine tuning of the first automated process occurs, such that the learning bot automatically makes at least one tuning adjustment to the first automated process;
responsive to a determination that the learning bot is in the third learning phase, the learning bot:
monitoring activity related to the first automated process;
collecting data related to the monitored activity;
analyzing at least a portion of the collected data;
identifying an automatic tuning adjustment responsive to the analyzing; and
automatically making the automatic tuning adjustment to the first automated process.

20. The computer-program product of claim 19, the method comprising, responsive to a determination that the learning bot is in the first learning phase:
monitoring activity related to the first automated process;
collecting data related to the monitored activity;
collecting data related to user tuning adjustments to the first automated process; and
storing, in a data store, at least a portion of the data related to the monitored activity and at least a portion of the data related to the user tuning adjustments.

* * * * *